(12) United States Patent
Liebl, III et al.

(10) Patent No.: US 9,332,018 B2
(45) Date of Patent: May 3, 2016

(54) METHOD AND SYSTEM FOR SECURE AUTHENTICATION

(71) Applicant: Prote.US Converged Systems Corporation, Austin, TX (US)

(72) Inventors: Alois Louis Liebl, III, Austin, TX (US); Edward Holland Johns, Philadelphia, PA (US); Brian Robert Silver, Austin, TX (US)

(73) Assignee: Prote. US Converged Systems Corporation, Austin, TX (US)

( * ) Notice: Subject to any disclaimer, the term of this patent is extended or adjusted under 35 U.S.C. 154(b) by 0 days.

(21) Appl. No.: 14/676,380

(22) Filed: Apr. 1, 2015

(65) Prior Publication Data

US 2015/0288694 A1 Oct. 8, 2015

Related U.S. Application Data

(60) Provisional application No. 61/974,633, filed on Apr. 3, 2014.

(51) Int. Cl.
*G06F 21/31* (2013.01)
*H04L 29/06* (2006.01)
*H04L 9/32* (2006.01)

(52) U.S. Cl.
CPC .............. *H04L 63/10* (2013.01); *G06F 21/31* (2013.01); *H04L 9/3247* (2013.01); *H04L 63/08* (2013.01)

(58) Field of Classification Search
CPC ....... H04L 63/08; H04L 63/10; H04L 9/3247; H04L 9/3249; H04L 9/3252; H04L 9/3255; H04L 9/3257; G06F 21/31; G06F 21/32
See application file for complete search history.

(56) References Cited

U.S. PATENT DOCUMENTS

| | | | | |
|---|---|---|---|---|
| 8,504,824 | B1* | 8/2013 | Abbott | H04L 67/20 380/44 |
| 2009/0037725 | A1 | 2/2009 | Farrugia et al. | |
| 2009/0265555 | A1 | 10/2009 | Royer | |
| 2009/0307744 | A1* | 12/2009 | Nanda | G06F 21/335 726/1 |
| 2011/0202466 | A1 | 8/2011 | Carter | |
| 2012/0084563 | A1 | 4/2012 | Singhal | |
| 2013/0013925 | A1 | 1/2013 | Buer et al. | |
| 2015/0180869 | A1* | 6/2015 | Verma | H04L 63/0838 726/4 |

OTHER PUBLICATIONS

International Search Report and Written Opinion issued in PCT/US2015/024100, mailed Jul. 14, 2015 (14 pages).

\* cited by examiner

*Primary Examiner* — Saleh Najjar
*Assistant Examiner* — Louis Teng
(74) *Attorney, Agent, or Firm* — Osha-Liang LLP

(57) ABSTRACT

A method and system for accessing a resource associated with a resource control entity that includes receiving, by a ledger, a request, corresponding to a user, to access the resource; obtaining, in response to the request, user metadata; sending to the user a ledger authentication token, which a credential application uses to verify that the ledger is a valid ledger; receiving, from the credential application, a public key encrypted payload including signature entries; decrypting, by the ledger, the encrypted payload using a payload secret key to obtain the signature entries and other user data; obtaining results of a verification by successively verifying each of the signature entries until a scoring threshold associated with the resource is met, and transmitting, to the resource control entity, a notification including the results of the verification, which the resource control entity uses to determine whether to grant the user access to the resource.

9 Claims, 12 Drawing Sheets

METHOD AND SYSTEM FOR SECURE AUTHENTICATION

CROSS-REFERENCE TO RELATED APPLICATIONS

Pursuant to 35 U.S.C. §119 (e), this application claims benefit of U.S. Provisional Application No. 61/974,633 filed on Apr. 3, 2014, entitled "METHOD AND SYSTEM FOR SECURE AUTHENTICATION." The disclosure of the U.S. Provisional application is incorporated herein by reference in its entirety.

BACKGROUND

It is often the case that an entity desires to restrict access to a resource, granting access only to authenticated users who are approved to access the resource. In such scenarios, when attempting to access the resource, a user commonly provides some form of information (e.g., a username and password, a pin code, etc.) to the entity restricting access to the resource. The entity will verify the information and, if some criteria are met (e.g., the password is correct), the entity grants the user access to the resource.

SUMMARY

In general, in one aspect, the invention relates to a method for accessing a resource that includes receiving, by a ledger, a request, corresponding to a user, to access the resource, where the resource is associated with a resource control entity. The method also includes, in response to the request, obtaining user metadata corresponding to the user, sending to the user a ledger authentication token (LAT) that a credential application uses to verify that the ledger is a valid ledger, and receiving, from the credential application executing on a user device of the user, an encrypted payload that includes a plurality of signature entries, where the encrypted payload is encrypted using a payload public key (PPK). Additionally, the method includes decrypting, by the ledger, the encrypted payload using a payload secret key (PSK) to obtain the plurality of signature entries and other user data, obtaining results of a verification by successively verifying each of the plurality of signature entries until a scoring threshold associated with the resource is at least met, and transmitting, to the resource control entity, a notification including the results of the verification, which the resource control entity uses to determine whether to grant the user access to the resource.

In general, in one aspect, the invention relates to a system for accessing a resource, associated with a resource control entity, that includes a ledger operatively connected to a user device of a user and to the resource control entity and configured to receive a request corresponding to the user to access the resource; in response to the request, obtain user metadata corresponding to the user; and send, to the user, a ledger authentication token (LAT), where the credential application uses the LAT to verify that the ledger is a valid ledger. The ledger is also configured to receive, from a credential application executing on the user device of the user, an encrypted payload comprising a plurality of signature entries, where the encrypted payload is encrypted using a payload public key (PPK). Additionally, the ledger is configured to decrypt the encrypted payload using a payload secret key (PSK) to obtain the plurality of signature entries; obtain results of a verification by successively verifying each of the plurality of signature entries until a scoring threshold associated with the resource is at least met; and transmit, to the resource control entity, a notification including the results of the verification, where the resource control entity uses the results of the verification to determine whether to grant the user access to the resource.

In general, in one aspect, the invention relates to a non-transitory computer readable medium including instructions that, when executed by a computer processor, perform a method for accessing a resource that includes receiving, by a ledger, a request corresponding to a user to access the resource, wherein the resource is associated with a resource control entity; in response to the request, obtaining user metadata corresponding to the user; sending, to the user, a ledger authentication token (LAT), where the credential application uses the LAT to verify that the ledger is a valid ledger; receiving, from a credential application executing on a user device of the user, an encrypted payload that includes a plurality of signature entries, where the encrypted payload is encrypted using a payload public key (PPK); decrypting, by the ledger, the encrypted payload using a payload secret key (PSK) to obtain the plurality of signature entries; obtaining results of a verification by successively verifying each of the plurality of signature entries until a scoring threshold associated with the resource is at least met; and transmitting, to the resource control entity, a notification including the results of the verification, where the resource control entity uses the results of the verification to determine whether to grant the user access to the resource.

Other aspects of the invention will be apparent from the following description and the appended claims.

DETAILED DESCRIPTION

Figure 1A:
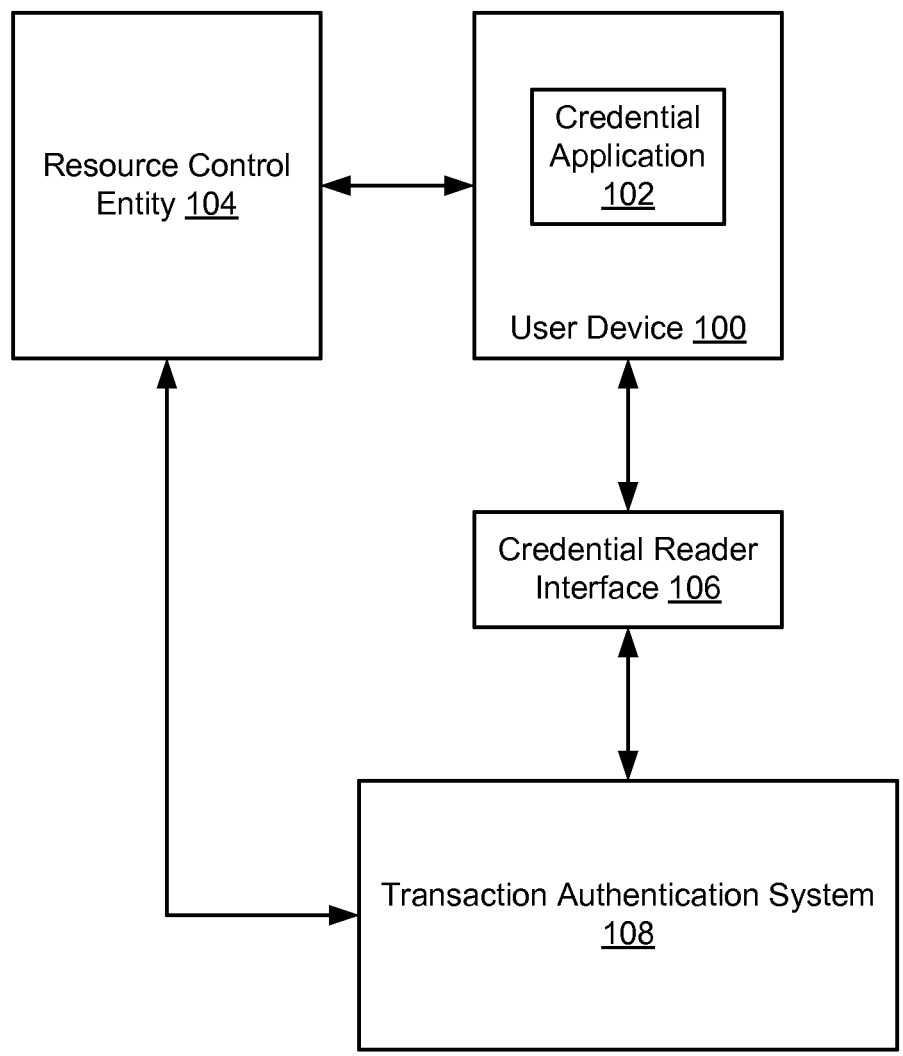
FIG. 1A shows a physical transaction system in accordance with one or more embodiments of the invention.

Specific embodiments of the invention will now be described in detail with reference to the accompanying figures. Like elements in the various figures may be denoted by like names and/or like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention related to a system and method for authenticating a transaction. Specifically, in one or more embodiments of the invention, data associated with a user (e.g., signature entries such as biometric data, passwords, etc.) is stored in an encrypted form (e.g., using the public key portion of an asymmetric public-private key pair) on the device of a user (e.g., a smartphone). In such embodiments of the invention, the user does not have appropriate private (i.e., secret) key(s) capable of decrypting the user data. Access to the user data may only be possible when the user provides the encrypted data to a ledger (e.g., via a credential reader interface), which includes the private key(s) to decrypt the user data. Once the user data is decrypted by the ledger, the ledger may include functionality to request that the user provide one or more signatures, which may be verified using one or more signature entries obtained as a part of the user data received and decrypted by the ledger. In one or more embodiments of the invention, after an attempted verification of a user using one or more signature entries, the ledger notifies a resource control entity the results of the user verification (e.g., success or failure). If the authentication is successful, the user may be granted access to a resource (e.g., unlocking a lock, proceeding with a secure financial transaction, gaining access to a secure portion of a website, etc.) by the resource control entity.

FIG. 1A shows a physical access transaction system in accordance with one or more embodiments of the invention. As shown in FIG. 1A, the system includes a user device (100), a credential application (102), a resource control entity (104), a credential reader interface (106), and a transaction authentication system (108). Each of these components is described below.

In one or more embodiments of the invention, a user device (100) is any computing device that is used by, possessed by, accessible by, and/or available in any other way to a user (not shown). A user may be any entity (e.g., a human, such as an employee, an online shopper, etc.) that may attempt to access any resource (e.g., unlock a door, access a secure network, etc.). In one or more embodiments of the invention, a computing device is any device and/or any set of devices capable of electronically processing instructions and that includes at least the minimum processing power, memory, input and output device(s), and/or network connectivity in order to contribute to the performance of at least some portion of the functions described in accordance with one or more embodiments of the invention. Examples of computing devices include, but are not limited to, a server (e.g., a blade-server in a blade-server chassis), a virtual machine (VM), a desktop computer, a mobile device (e.g., laptop computer, smartphone, personal digital assistant, tablet computer, and/or any other mobile computing device), and/or any other type of computing device with the aforementioned minimum requirements.

In one or more embodiments of the invention, the user device (100) includes functionality to execute a credential application (102). A credential application (102) may be any software, hardware, firmware, and/or any combination thereof that includes functionality to, at least, store encrypted user data and to interact (e.g., via a wireless connection, via a network, via a device-to-device connection, etc.) with a ledger (not shown) of a transaction authentication system (108).

As an example, the user device may interact with the ledger, at least in part, via credential reader interface (106). Ledgers are discussed further in the detailed description of a transaction authentication system of FIG. 1C, below. As an example, a credential application (102) may be an "app" downloaded by a user to be executed on the user's smartphone.

In one or more embodiments of the invention, the credential application (102) includes functionality to receive, store, transmit, and/or interact with a user and a ledger regarding a credential (not shown). In one or more embodiments of the invention, a credential is a collection of information stored on a user device (100) by a credential application (102), and which is encrypted by a ledger of a transaction authentication system (108) before being stored on the user device. Other information corresponding to a user may be stored on the user device and accessible by, at least, the credential application. For example, the user device may store a ledger cluster synonym identifying a specific one or more ledgers (discussed below) that are operatively connected to a ledger repository in which at least a portion of user metadata (discussed below) is stored.

A credential may include one or more encrypted signature entries, scores, factors of authentication, user financial data (e.g., credit card information), and/or data defined by a resource control entity (e.g., user email addresses). A signature entry may be user provided data corresponding to a factor of authentication, which is scored (e.g., based on a scoring policy of a resource control entity) by the credential application. The signature entry and the corresponding score may be added to the credential by the credential application. A factor of authentication may be a specified type of data that must be authenticated as at least a part of a user authentication process. Examples of factors of authentication include, but are not limited to, passwords, pin numbers, responses to secret questions, various motions/gestures, spoken words or phrases, biometric data, and/or image data. Accordingly, signature entries are user generated/provided responses that correspond to a factor of authentication. For example, a user may provide an iris scan, a fingerprint, a facial recognition scan, and/or an electrocardiogram result corresponding to a biometric data factor of authentication. As another example, a user may perform a certain series of motions recorded, at least in part, using an accelerometer of a user device, which correspond to a motion factor of authentication. In one or more embodiments of the invention, the credential application also includes functionality to receive scoring policies (e.g., from a ledger, a resource control entity, etc.), as well as to score signatures obtained from the user.

In one or more embodiments of the invention, a credential may include, along with one or more signature entries, other user data such as, for example, user identifiers (e.g., one or more usernames, user synonyms, user aliases, etc.), user financial transaction information (e.g., credit card information), ledger cluster synonyms identifying a ledger associated with user data, and/or organizational synonyms related to an organization (e.g., an employer) associated with a user. Data such as user synonyms, ledger cluster synonyms, and/or organizational synonyms may be included in the credential in an unencrypted format, while other portions of the credential (e.g., signature entries) may be encrypted. In one or more embodiments of the invention, a credential may be valid indefinitely, may be subject to time limits set by a resource control entity, and/or may be subject to a limit on the number of uses set by the resource control entity (e.g., as a part of a resource use policy).

In one or more embodiments of the invention, a resource control entity (104) includes various components, such as personnel, computing devices, software applications, and/or services, that include functionality to set and/or distribute one or more policies related to accessing one or more resources administered by the resource control entity (104), and to grant and/or deny access to one or more resources based, at least in part, on the results of a user authentication attempt provided by a ledger of a transaction authentication system (108). A resource control entity (104) may be one or more persons, software and/or hardware (e.g., a software application executing on a computing device), and/or any combination thereof. For example, the resource control entity (104) may include a person in a security division of a corporation responsible for providing physical access to certain of the corporation's laboratories to a new employee (i.e., a user) and who uses a computing device of the resource control entity to interact with the transaction authentication system and a user. As another example, a resource control entity may be a service executing on a computing device that includes functionality to grant or deny access to a safety deposit box at a bank based on the results of a user authentication received from a transaction authentication system (108). In one or more embodiments of the invention, at least some portion of the resource control entity (104) is operatively connected, at least some of the time, to a user device (100) and/or to a transaction authentication system (108).

In one or more embodiments of the invention, a resource control entity (104) is any entity (e.g., a human, a company, one or more computing devices, etc.) that includes, at least, functionality to perform administrative functions related to accessing a resource. Administrative functions may include, but are not limited to, sending, to a ledger of a transaction authentication system, information and/or access requests corresponding to a user, determining a scoring policy related to a resource, providing a scoring policy to a ledger of a transaction authentication system, and/or receiving from a ledger the results of user authentication attempts. A resource, as used herein, may include, but is not limited to, physical space (e.g., building, laboratory, locked container), a retail transaction, performance of a restricted action, access to transportation, and/or performance of a healthcare related action (e.g., releasing medical details to a hospital). Each of the aforementioned examples of a resource may be referred to as physical resources. A resource may instead be a logical resource. Logical resources are discussed further in the description of FIG. 1B, below.

In one or more embodiments of the invention, a scoring policy (not shown), which may be set by and distributed by a resource control entity (104), is a policy that defines what score is assigned to one or more factors of authentication (described above) and/or what scores are assigned as threshold scores associated with access to one or more resources. A factor of authentication may be associated with a single score for a successful verification of a signature provided by a user to satisfy the factor of authentication, or be associated with any number of scores based, for example, on the strength of the signature provided corresponding to the factor of authentication. For example, the resource control entity may set a policy related to a password factor of authentication that passwords (i.e., the signature corresponding to a password factor of authentication) less than a certain length are worth one score, while passwords over the certain length are worth a higher score.

In one or more embodiments of the invention, the user device (100) may, at least at times, be operatively connected to a credential reader interface (106). A credential reader interface (106) may be any software, hardware, firmware, and/or any combination thereof, which includes functionality to interact with a credential application executing on a user device. For example, the credential reader interface may be a device that includes a Bluetooth® low energy (LE) reader that includes functionality to obtain data from, and/or provide data to, devices within range and that are capable of interacting via Bluetooth.

In one or more embodiments of the invention, the credential reader interface (106) includes functionality to perform a proximity range transaction. A proximity range transaction may be a transaction in which the credential reader interface (106) determines if the user device executing a credential application is within a pre-defined physical range of the credential reader interface (e.g., ten feet). In one or more embodiments of the invention, the credential reader interface (106) is operatively connected to a transaction authentication system and includes functionality to provide user data obtained from a credential application (102) executing on a user device (100) to the transaction authentication system (108). A credential reader interface may also include functionality to transmit data (e.g., an encrypted credential received from a transaction authentication system (108)) to a credential application (102) of a user device (100). Additionally, though FIG. 1 shows a credential reader interface separate from and operatively connected to the transaction authentication system, one of ordinary skill in the relevant art and having the benefit of this disclosure will understand that the credential reader interface may be included as a component of the transaction authentication system.

In one or more embodiments of the invention, a transaction authentication system (108) is any software, hardware, firmware, and/or any combination thereof that includes functionality to perform one or more operations related to authenticating a user before the user is granted access to a resource. In one or more embodiments of the invention, at minimum, the transaction authentication system includes a ledger. Transaction authentication systems are discussed in further in the description of FIG. 1C, below.

Figure 1B:
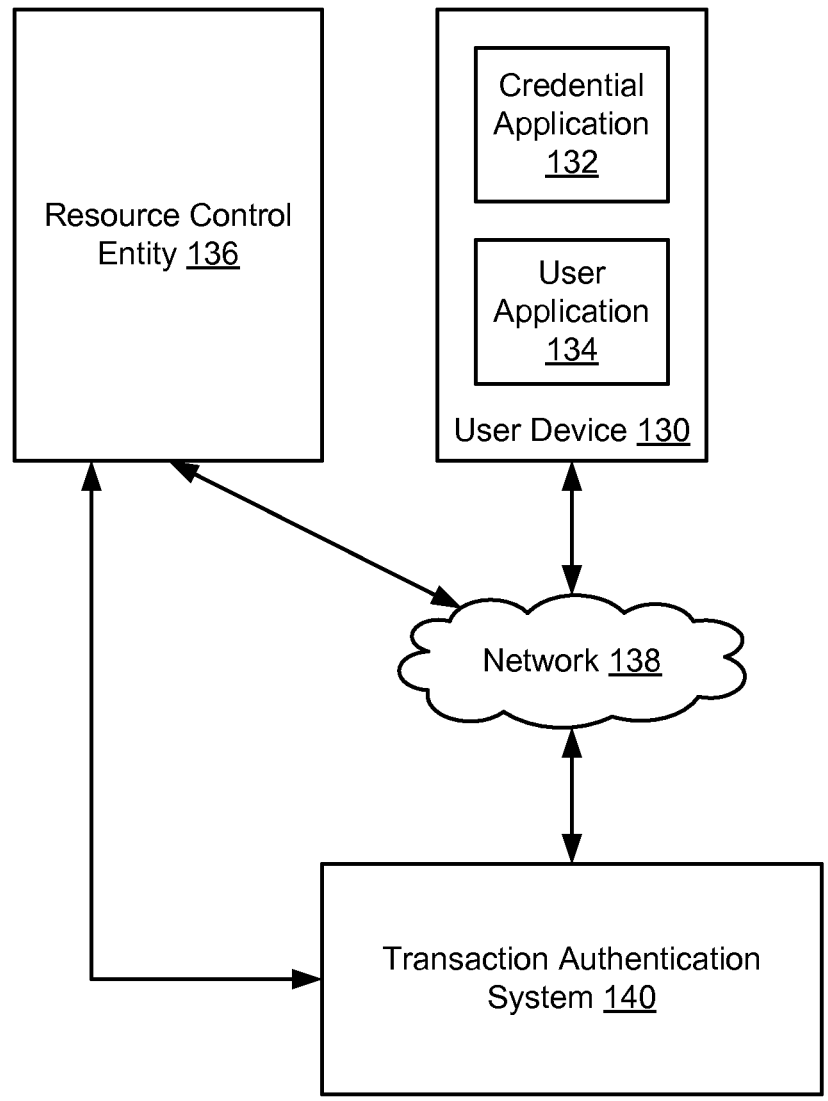
FIG. 1B shows a logical transaction system in accordance with one or more embodiments of the invention.

FIG. 1B shows a logical access transaction system in accordance with one or more embodiments of the invention. As shown in FIG. 1B, the system includes a user device (130), a credential application (132), a user application (134), a resource control entity (136), a network (138), and a transaction authentication system (140). Each of these components is described below.

In one or more embodiments of the invention, the user device (130) shown in FIG. 1B is substantially similar to the user device shown in FIG. 1A (i.e., user device (100)). Also, the credential application (132) shown in FIG. 1B may be substantially similar to the credential application discussed in the description of FIG. 1, above (e.g., credential application (102)). Additionally, the user device (130) may include functionality to execute one or more user applications (e.g., user application (134)). In one or more embodiments of the invention, a user application (134) is any application that includes functionality to be executed, at least in part, on a user device and that may be used, in part, to access, or attempt to access, a resource. For example, a user application (134) may be a web browser executing on a smartphone of a user (not shown), with which a user accesses a website designed to allow secure online purchases. As another example, a user application (134) may be a network access application, which facilitates, at least in part, accessing a secured network from the user device.

In one or more embodiments of the invention, a resource control entity (136) is substantially similar to the resource control entity (i.e., resource control entity (104)) discussed above in the description of FIG. 1A. In one or more embodiments of the invention, a resource control entity (136) is any entity (e.g., a corporation, a government, etc.) that provides access to a resource for use by other entities (e.g., a user of a user device (130)). Examples of a resource that may be referred to as logical resources include, but are not limited to, performance of an online purchase, a corporate software application, an online banking session, a secure network (e.g., a virtual private network), a cloud-hosted software application, and/or a secure website.

In one or more embodiments of the invention, a resource control entity (136) is operatively connected to the user device (130). The resource control entity may be operatively connected to the user device via a network (138). In one or more embodiments of the invention, a network (138) is a collection of one or more network devices (not shown) that facilitate network connectivity for one or more operatively connected computing devices (e.g., resource control entity (136), user device (130), transaction authentication system (140)). In one or more embodiments disclosed of the invention, the network (138) may be all or a portion of a computer network. A computer network may include a datacenter network, a wide area network, a local area network, a wireless network, a cellular phone network, and/or any other suitable network that facilitates the exchange of information from one part of the network to another. The network (138) may be coupled with or overlap with the Internet.

In one or more embodiments of the invention, the resource control entity (136) is operatively connected to a transaction authentication system (140). In one or more embodiments of the invention, the resource control entity (136) may interact with the transaction authentication system via the network (138) and/or via any other form of communication (e.g., phone, in-person, etc.). In one or more embodiments of the invention, a portion of the interaction between the resource control entity and the transaction authentication system occurs via a network, and another portion may occur via other forms of communication.

In one or more embodiments of the invention, the transaction authentication system (140) is substantially similar to the transaction authentication system discussed in the description of FIG. 1A, above (i.e., transaction authentication system (108)), and is discussed further in the description of FIG. 1C, below.

Figure 1C:
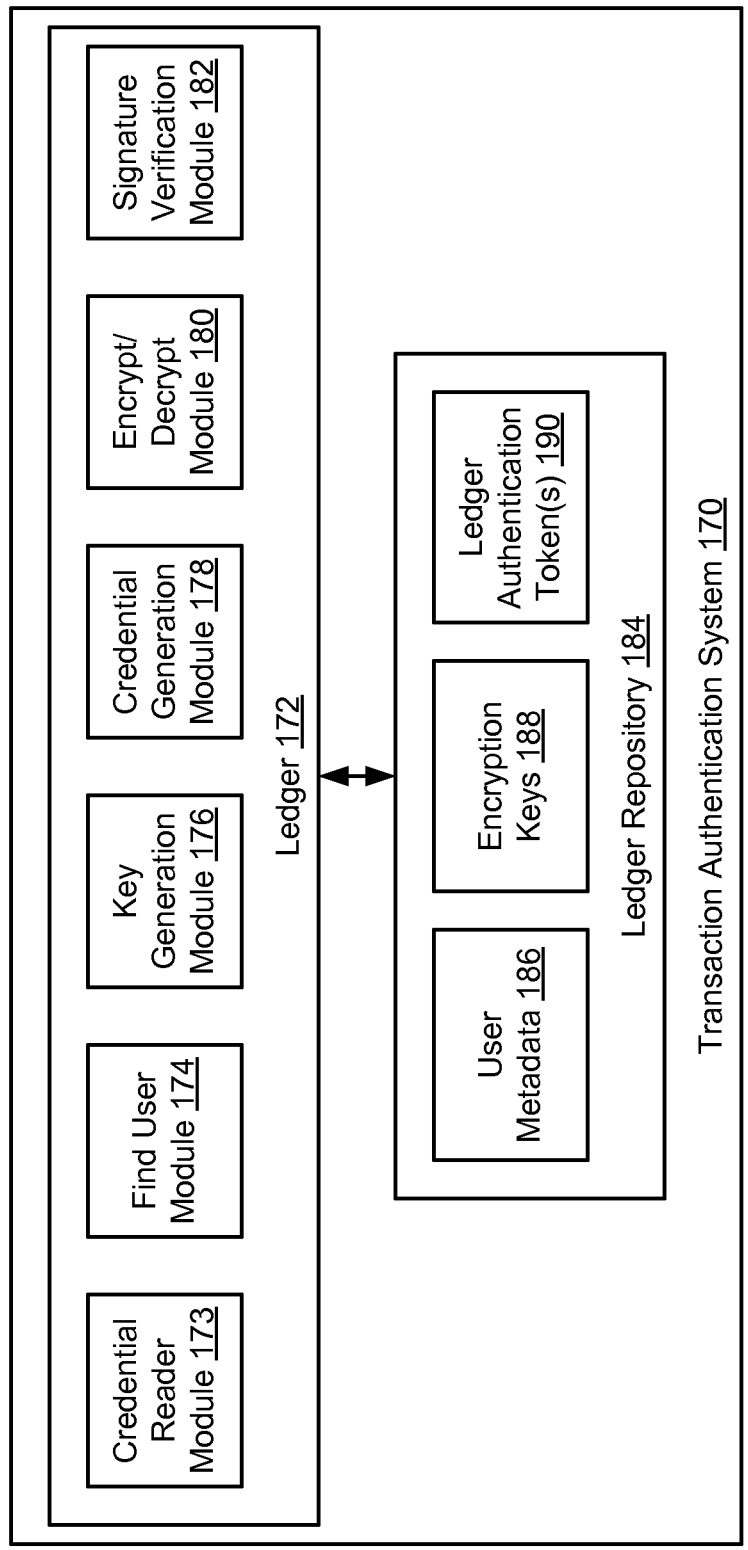
FIG. 1C shows a detailed transaction authentication system in accordance with one or more embodiments of the invention.

FIG. 1C shows a detailed transaction authentication system in accordance with one or more embodiments of the invention. As shown in FIG. 1C, the transaction authentication system (170) includes a ledger (172) and a ledger repository (184). The ledger (172) may include a find user module (174), a key generation module (176), a credential generation module (178), an encrypt/decrypt module (180), and a signature verification module (182). The ledger repository (184) may include user metadata (186) for one or more users, one or more encryption keys (188), and one or more ledger authentication tokens (LATs) (190). Each of these components is described below.

In one or more embodiments of the invention, a transaction authentication system (170) includes one or more computing devices. The transaction authentication system may include functionality to interact with other entities via a network (e.g., network (138) of FIG. 1B), and/or via any other form of communication. In one or more embodiments of the invention, the transaction authentication system (170) includes functionality to perform operations related to the authentication of a user (not shown) when the user attempts to access a resource (not shown).

In one or more embodiments of the invention, the transaction authentication system (170) includes a ledger (172). A ledger (172) may be software, hardware, firmware, and/or any combination thereof that includes functionality to perform one or more operations related to the authentication of a user. For example, the ledger (172) may be a software application, or a portion thereof, executing on one or more computing devices of the transaction authentication system (170). As another example, the ledger (172) may execute in a virtual machine using a portion of the computing resources of a computing device of the transaction authentication system.

In one or more embodiments of the invention, the ledger (172) includes a credential reader module (173). In one or more embodiments of the invention, a credential reader module (173) is a portion of the software, hardware, and/or firmware of the ledger (172). For example, the credential reader module (173) may be a software configured to obtain and/or receive a credential from a credential application for the ledger. Continuing the example, the credential reader module (173) may include functionality to receive and/or send data (e.g., credentials) to and/or from the credential application via the credential reader interface (discussed above).

In one or more embodiments of the invention, the ledger (172) includes a find user module (174). In one or more embodiments of the invention, a find user module (174) is a portion of the software, hardware, and/or firmware of the ledger (172). For example, the find user module (174) may be a routine that is called by the ledger to perform certain functionality. In one or more embodiments of the invention, the find user module (174) includes functionality to locate data related to a user when given an input associated with the user. For example, the find user module (174) may include functionality to receive a user email address, and use the email address to locate other information associated with the user.

In one or more embodiments of the invention, the ledger (172) includes a key generation module (176). In one or more embodiments of the invention, a key generation module (176) is a portion of the software, hardware, and/or firmware of the ledger (172). For example, the key generation module (176) may be circuitry and associated software to which the ledger (172) provides a key generation request, and which includes functionality to respond to the key generation request by generating one or more encryption key pairs (not shown). An encryption key pair may be any pair of encryption keys that may be used to decrypt and/or encrypt data. One example of an encryption key pair is a public-private asymmetric key pair. Such key pairs include both a public key, which may be used by entities desiring to encrypt data, and a private key (i.e., a secret key), which is not meant to be shared and which may be used to decrypt data previously encrypted using a corresponding public key.

In one or more embodiments of the invention, the key generation module (176) includes functionality to generate any type and any quantity of encryption key pairs. The key generation module may also include functionality to provide for the ledger (172) one or more identifiers associated with a public key, a private key, and/or both keys of an encryption key pair (e.g., a public key ID). Public keys may be used by any entity to perform encryption of data. For example, a public key may be used by the ledger (172) to encrypt data associated with a user (e.g., a credential) before transmitting the data to the user. As another example, a user may be provided with one or more public keys of one or more encryption key pairs, which may be used by a credential application executing on a user device to encrypt data before the data is transmitted to the transaction authentication system (170).

In one or more embodiments of the invention, the ledger (172) includes a credential generation module (178). In one or more embodiments of the invention, a credential generation module (178) is a portion of the software, hardware, and/or firmware of the ledger (172). For example, the credential generation module (178) may be a sub-portion of the ledger software application that is designed to generate credentials for the ledger (172). In one or more embodiments of the invention, the credential generation module (178) includes functionality to receive requests from the ledger (172) to generate a credential for a user, and to respond to the request by generating the requested credential. In one or more embodiments of the invention, a credential (not shown) includes one or more scored signature entries (e.g., previously provided by a user and scored by the credential application) as well as any other information associated with a user (e.g., user identifiers for various resources, alternate email addresses, credit card data, etc.).

In one or more embodiments of the invention, the ledger (172) includes an encrypt/decrypt module (180). In one or more embodiments of the invention, an encrypt/decrypt module (180) is a portion of the software, hardware, and/or firmware of the ledger. For example, the encrypt/decrypt module may be software executing in a trusted execution environment portion of the ledger software and/or hardware. The encrypt/decrypt module (180) may include functionality to perform encryption and/or decryption of data (e.g., a credential, a signature, etc.). The encrypt/decrypt module (180) may include functionality to use one or more keys (e.g., public keys, private keys) generated by the key generation module (176) in order to perform encryption and/or decryption operations.

In one or more embodiments of the invention, the ledger (172) includes a signature verification module (182). In one or more embodiments of the invention, a signature verification module (182) is a portion of the software, hardware, and/or firmware of the ledger. For example, the signature verification module (182) may include circuitry for performing a comparison of a user provided signature and a decrypted signature entry. In one or more embodiments of the invention, the signature verification module (182) also includes functionality to perform operations related to scoring of signatures based on a scoring policy set and provided by a resource control entity. For example, when performing a verification of one or more signature entries, the signature verification module may include functionality to obtain the score from the credential that is generated by the credential application and associated with the signature entry, and to determine whether a cumulative score of one or more verified signature entries meets a pre-determined threshold score for accessing a resource.

In one or more embodiments of the invention, the transaction authentication system (170) includes a ledger repository (184) operatively connected to the ledger (172). In one or more embodiments of the invention, the ledger repository (184) is a data repository for storing, at least in part, data corresponding to one or more users. The ledger repository (184) may also store data for use by a ledger in performing one or more operations related to authentication of a user attempting to access a resource and/or enroll in a user authentication process. In one or more embodiments of the invention, a data repository is any type of storage unit and/or device (e.g., a file system, database, collection of tables, or any other storage mechanism) for storing data/information. Specifically, the data repository may include hardware and/or software. Further, the data repository may include multiple different storage units and/or devices. The multiple different storage units and/or devices may or may not be of the same type or located at the same physical site. As shown in FIG. 1C, the data repository is included as a part of the transaction authentication system (170). In other embodiments of the invention, the data repository is a stand-alone repository that is operatively connected to and accessed, at least, by the ledger (172) of the transaction authentication system (170).

In one or more embodiments of the invention, the ledger repository (184) includes user metadata (186). In one or more embodiments of the invention, user metadata (186) is any information corresponding to a user. User metadata (186) may include, but is not limited to, user identifiers, user synonyms (e.g., a universally unique identifier), user names and/or user email addresses. The ledger repository may additionally include data for use in identifying a ledger on which data associated with a user is located (e.g., a ledger cluster synonym), and/or data identifying an entity (e.g., a company) with which the user is associated (e.g., an organizational synonym). In one or more embodiments of the invention, all users with user metadata stored in a ledger repository operatively connected to a given ledger may be associated with the same entity, which is identified by an organizational synonym.

In one or more embodiments of the invention, the ledger repository (184) includes encryption keys (188). For example, encryption keys may be one or more public keys, private keys, and/or public-private key pairs generated by the key generation module (176) of the ledger (172). Encryption keys (188) may be associated with user metadata (186) and may be used to encrypt or decrypt data associated with a user (e.g., credentials, signature entries included in a credential, signatures received from a user device during a credential generation process, etc.).

In one or more embodiments of the invention, the ledger repository (184) includes one or more ledger authentication tokens (LATs) (190). A LAT may be associated with user metadata (186) corresponding to a user. In one or more embodiments of the invention, LATs (190) are used as a part of various transactions so that a credential application may verify that an interaction with a purported ledger is being conducted between the user and an authentic ledger. A LAT may take any form (e.g., the hash of a universally unique identifier, a specific image, etc.) capable of expressing to a user that the ledger from which an LAT is received is an authentic ledger. In one or more embodiments of the invention, a LAT is generated by a credential application, encrypted, and sent to the transaction authentication system (170). In such embodiments, the transaction authentication system (170) includes functionality (e.g., using the encrypt/decrypt module of the ledger) to decrypt a received encrypted LAT and store it in the ledger repository associated with user metadata corresponding to the user whose credential app generated the LAT.

While FIG. 1A, FIG. 1B, and FIG. 1C show configurations of components, other configurations may be used without departing from the scope of the embodiments disclosed herein. For example, various components may be combined to create a single component. As another example, the functionality performed by a single component may be performed by two or more components. In one or more embodiments of the invention, one or more of the modules and elements shown in FIGS. 1A-1C may be omitted, repeated, and/or substituted. Accordingly, embodiments disclosed herein should not be considered limited to the specific arrangements of modules and elements shown in FIG. 1A, FIG. 1B, and/or FIG. 1C.

FIG. 2A, FIG. 2B, FIG. 3A, FIG. 3B, FIG. 4, and FIG. 5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2A:
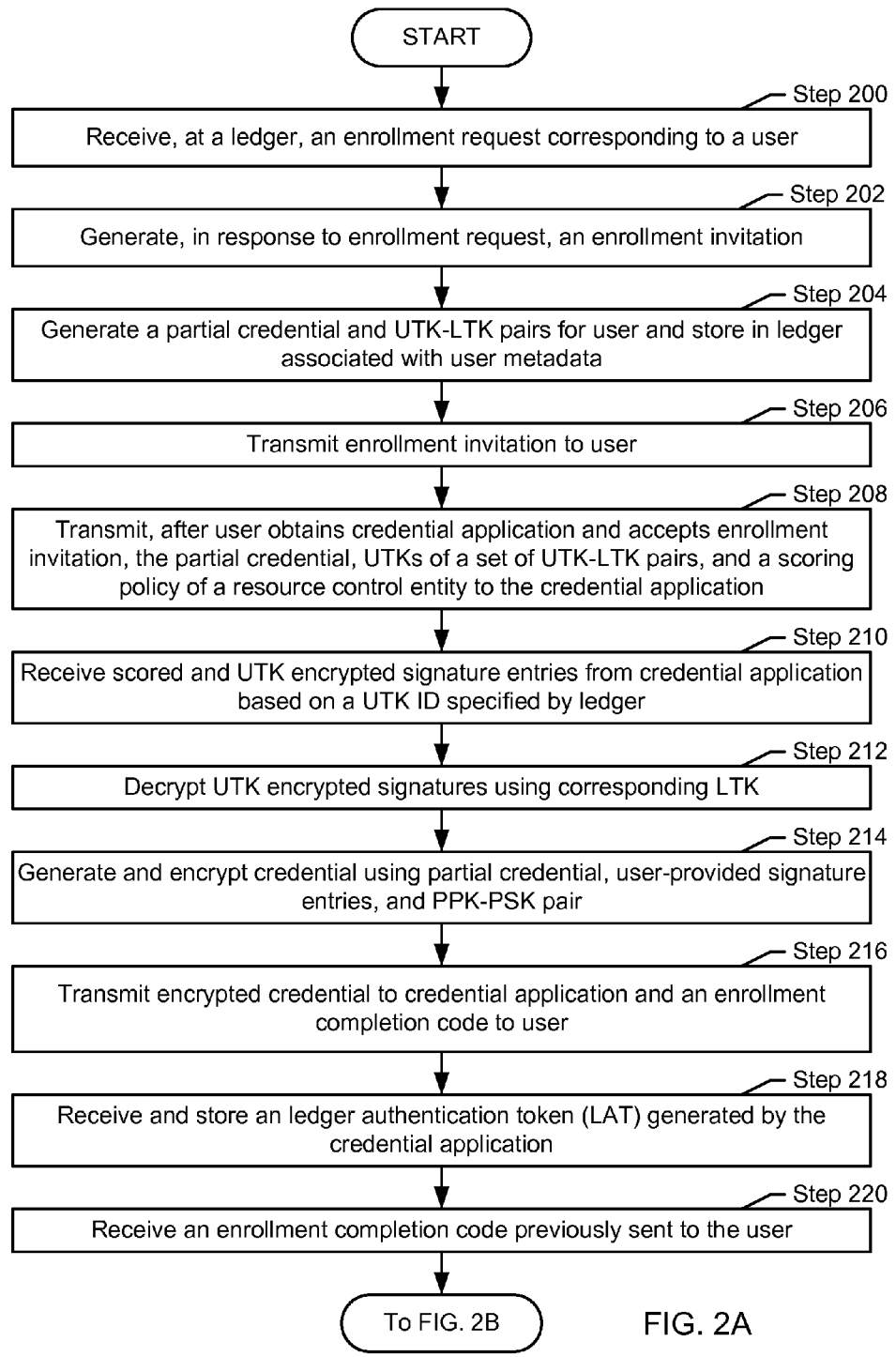
FIG. 2A, FIG. 2B, FIG. 3A, FIG. 3B, FIG. 4, and FIG. 5 each show a flowchart in accordance with one or more embodiments of the invention.

FIG. 2A shows a flowchart describing a method for a portion of a user enrollment process in accordance with one or more embodiments of the invention. In Step 200, an enrollment request corresponding to a user is received. In one or more embodiments of the invention, an enrollment request is a request that a user be enrolled in user authentication process in which a transaction authentication system obtains and uses an encrypted credential stored on a user device in order to authenticate a user before access to a resource is granted or denied by a resource control entity.

In one or more embodiments of the invention, the enrollment request is received from a resource control entity. For example, the enrollment request may be received from a resource control entity on behalf of a new employee of a company. As another example, a user attempting to sign up for access to a website may provide some user data to the website provider, which may in turn provide at least some of the information to a transaction authentication system as at least part of an enrollment request. An enrollment request may include, at least, one or more user synonyms (e.g., a user name, email address, etc.) that may be used by a transaction authentication system to contact a user and that may be stored as part of user metadata.

In Step 202, in response to the received enrollment request, a transaction authentication system may generate an enrollment invitation. In one or more embodiments of the invention, an enrollment invitation is an invitation for a user to enroll in the aforementioned user authentication process. An enrollment invitation may include, but is not limited to, instructions to obtain a credential application (e.g., download the credential application from an App Store), information related to the enrollment process, a user synonym, a ledger cluster synonym, an organizational synonym, and/or an enrollment verification code.

In Step 204, the ledger generates a partial credential and a set of user transaction keys (UTKs) and ledger transaction keys (LTKs) (i.e., a set of UTK-LTK pairs) for use in the enrollment process. A partial credential may be a credential that includes any information related to a user other than signature entries, which the user has not yet provided to the ledger for inclusion in the credential. Examples of information included in a partial credential may include, but are not limited to, user metadata (e.g., one or more user identifiers related to a resource control entity), a ledger cluster synonym, and an organizational synonym. A UTK may be the public portion, and a LTK may be the private portion, of a public-private asymmetric key pair (i.e., a UTK-LTK pair) generated by the key generation module of a ledger executing on a computing device of a transaction authentication system. Any quantity of UTK-LTK pairs may be generated related to a given user, and the quantity may be set by a policy disseminated by a resource control entity to the transaction authentication system. The UTK-LTK pairs may be stored, along with the partial credential, in the ledger repository associated with metadata corresponding to the user for whom the enrollment invitation was generated in Step 202. In one or more embodiments of the invention, the partial credential also includes information related to factors of authentication for which a user may provide a signature response (e.g., biometric data, password, etc.) and that are required, at least in part, by a policy set by the resource control entity for use in accessing a resource.

In Step 206, the enrollment invitation generated in Step 202 is transmitted to a user. In one or more embodiments of the invention, the enrollment invitation is conveyed to a user via any scheme by which data may be transmitted. For example, the enrollment invitation may be transmitted to a user via email, text message, instant message, app notification, paper mail, etc.

In Step 208, after a user, in response to the enrollment invitation, has accepted the enrollment invitation and obtained the credential application, the ledger transmits the partial credential and a set of UTKs to the credential application (e.g., executing on the user device). In one or more embodiments of the invention, the UTKs are the public key portions of the UTK-LTK pairs generated in Step 204. In one or more embodiments of the invention, the UTKs are optionally discarded from the ledger after transmitting the UTKs to the credential, leaving only the LTK portions of the UTK-LTK pairs associated with the user metadata in the ledger repository. In one or more embodiments of the invention, at least some portion of the data included in the enrollment invitation may be imported into the partial credential once the partial credential is received by the credential application. Additionally, one having ordinary skill in the relevant art and having the benefit of this disclosure will recognize that although UTKs are described herein as being sent to the credential application during the enrollment process, UTKs may be transmitted to a credential application at any time, including after the user is already enrolled, in the event that a user requires additional UTKs to encrypt signatures, LATs etc. For example, the ledger may be configured to provide a pool of UTKs to the credential application generally sufficient for at least one transaction (e.g., twenty UTKs). In such an example, the pool of UTKs may be updated during an enrollment process, after successful authentication of a user to access a resource, and/or during a credential reset process (discussed below).

In Step 210, one or more encrypted signatures are received from the credential application. In one or more embodiments of the invention, the credential application prompts the user to provide signatures in response to one or more factors of authentication specified in the partial credential. Signatures may be any type of response to any type of factor of authentication. For example, a signature may be a fingerprint scan, a secret spoken passphrase, etc.

In one or more embodiments of the invention, the credential application scores each signature. In one or more embodiments of the invention, the score is determined using the signature and a scoring policy set and disseminated to the credential application from the resource control entity. For example, if the factor of authentication for which a signature is obtained is a motion factor of authentication, the credential application will assess the motion related data in the signature and assign a score, based on the scoring policy, which ranges from zero (e.g., not a match) to four (e.g., a perfect match), with scores of two or three being possible based on how closely the motion data of the signature matches the motion data of the signature entry. Once the signatures are obtained from the user and scored, the credential application may encrypt the one or more signatures and associated scores using one or more UTKs previously sent to the credential application by the ledger. Each signature may be encrypted using a different UTK, all the signatures may be encrypted using the same UTK, and/or any combination of keys may be used to encrypt any combination of signatures. The UTKs used to encrypt the signatures may be selected by the credential application based on one or more UTK identifiers specified by the ledger (e.g., in a partial credential). In one or more embodiments of the invention, once the signatures are encrypted, the credential application transmits the UTK encrypted signatures to the ledger of the transaction authentication system. In one or more embodiments of the invention, each signature (or group of signatures) encrypted with a different UTK may be transmitted to the ledger, which provided the UTK identifiers specifying UTKs for use in performing encryption. The ledger therefore knows which LTK to use when decrypting the signature(s). In other embodiments of the invention, the credential application selects the UTK to use to perform a given encryption, and transmits a corresponding UTK identifier to the ledger for use in selecting the corresponding LTK to perform a decryption. In one or more embodiments of the invention, the credential application may also obtain other user data (e.g., user credit card information) from the user, encrypt the data using a UTK, and transmit the UTK encrypted user data to the ledger.

In Step 212, the ledger decrypts the received one or more UTK encrypted signatures using the LTK corresponding to the UTK used to encrypt the signatures. In one or more embodiments of the invention, the ledger assesses the received signatures to determine a UTK identifier (e.g., a UTK identifier previously specified by the ledger to the credential application) for each UTK used to encrypt a signature received from the user via the credential application. The ledger may use the UTK identifier to retrieve the LTK corresponding to the UTK. The LTKs may then be used by the ledger to decrypt the UTK encrypted signatures to obtain decrypted signatures. In one or more embodiments of the invention, the ledger also receives other UTK encrypted user data (e.g., credit card information) and decrypts it in a similar manner.

In Step 214, a credential is generated for a user to use during a user authentication process. The user authentication process is discussed further in the description of FIG. 3A and FIG. 3B, below. In one or more embodiments of the invention, creating the credential includes adding the signatures (i.e., as signature entries) and any other user related data decrypted in Step 212 to the partial credential generated in Step 204. In one or more embodiments of the invention, once the credential includes all necessary data, the ledger encrypts the credential, or a portion thereof. Encrypting the credential may include generating, by the ledger, a public-private key pair that includes a payload public key (PPK) and a payload secret key (PSK) (i.e., a PPK-PSK pair), encrypting the credential using the PPK, discarding the PPK, and storing the corresponding PSK in the ledger repository associated with the user metadata. In one or more embodiments of the invention, instead of the entire credential being encrypted using the same PPK, a set of PPK-PSK pairs may be generated and any number of PPKs from the set may be used, with each PPK being used to encrypt a portion of the payload. For example, each signature entry, and the remaining information included in the credential, may be encrypted using a different PPK. In such an example, a set of PSKs corresponding to the PPKs may be stored associated with the user metadata.

In Step 216, the credential encrypted in Step 214 is transmitted to the credential application of a user, and an enrollment completion code is provided to the user. In one or more embodiments of the invention, the encrypted credential and the enrollment completion code may be transmitted to the credential application via any method of conveying data from one device to another. For example, the encrypted credential and the enrollment completion code may be transmitted to the credential application via a network. As another example, the encrypted credential and the enrollment completion code may be transmitted via a wireless connection (e.g., Bluetooth LE). In one or more embodiments of the invention, the encrypted credential and the enrollment completion code are transmitted to a user using different communication channels. For example, the encrypted credential may be wirelessly transmitted to the credential application executing on the user device while the enrollment completion code is transmitted to the user via email. In one or more embodiments of the invention, a copy of the enrollment completion code is stored in the ledger repository associated with the user metadata.

In Step 218, the ledger receives a ledger authentication token (LAT) generated by the credential application. As discussed above in the description of FIG. 1C, a LAT is data that may be used by a credential application to verify that the purported ledger with which a user authentication process is being conducted is a valid ledger (e.g., not an imposter ledger). In one or more embodiments of the invention, the LAT is generated by a credential application. Generation of the LAT may be performed by the credential application in response to the receipt of the encrypted credential and enrollment completion code transmitted by the ledger in Step 216. The LAT may be any type of data. For example, the LAT may be a hash of a date and time that an event previously occurred. In one or more embodiments of the invention, the LAT, after being generated by the credential application, is randomized and then hashed by the credential application.

In one or more embodiments of the invention, the LAT is encrypted by the credential application using a UTK previously provided by the ledger. The encrypted LAT may then be sent to the ledger. In one or more embodiments of the invention, the ledger decrypts the LAT using the LTK corresponding to the UTK used to encrypt the LAT. Once the LAT is decrypted, the LAT is stored by the ledger in the ledger repository associated with user metadata corresponding to the user of the credential application that generated the LAT. One having ordinary skill in the relevant art and having the benefit of this disclosure will recognize that although selection of, transmission of, encryption/decryption of, and storing of a LAT is described herein as a part of the enrollment process, a LAT may be changed at any time. For example, sometime after completing the enrollment process and using a credential, a resource control entity may require that a credential application change/update a LAT. In such an example, the credential application and the ledger would go through a similar process to change/update the LAT.

In Step 220, the ledger receives the enrollment completion code sent to the user in Step 216. In one or more embodiments of the invention, the enrollment completion code is transmitted to the resource control entity by the user, and the resource control entity, in turn, transmits the enrollment completion code to the ledger. The enrollment completion code may be transmitted from the user and/or from the resource control entity using any means of conveying data. For example, the user may access a website of the resource control entity and enter the enrollment completion code into a certain field, alerting the resource control entity that the user has completed at least a portion of the enrollment process, and has received an encrypted credential. After the ledger receives the enrollment completion code corresponding to the user, the process proceeds to FIG. 2B.

Figure 2B:
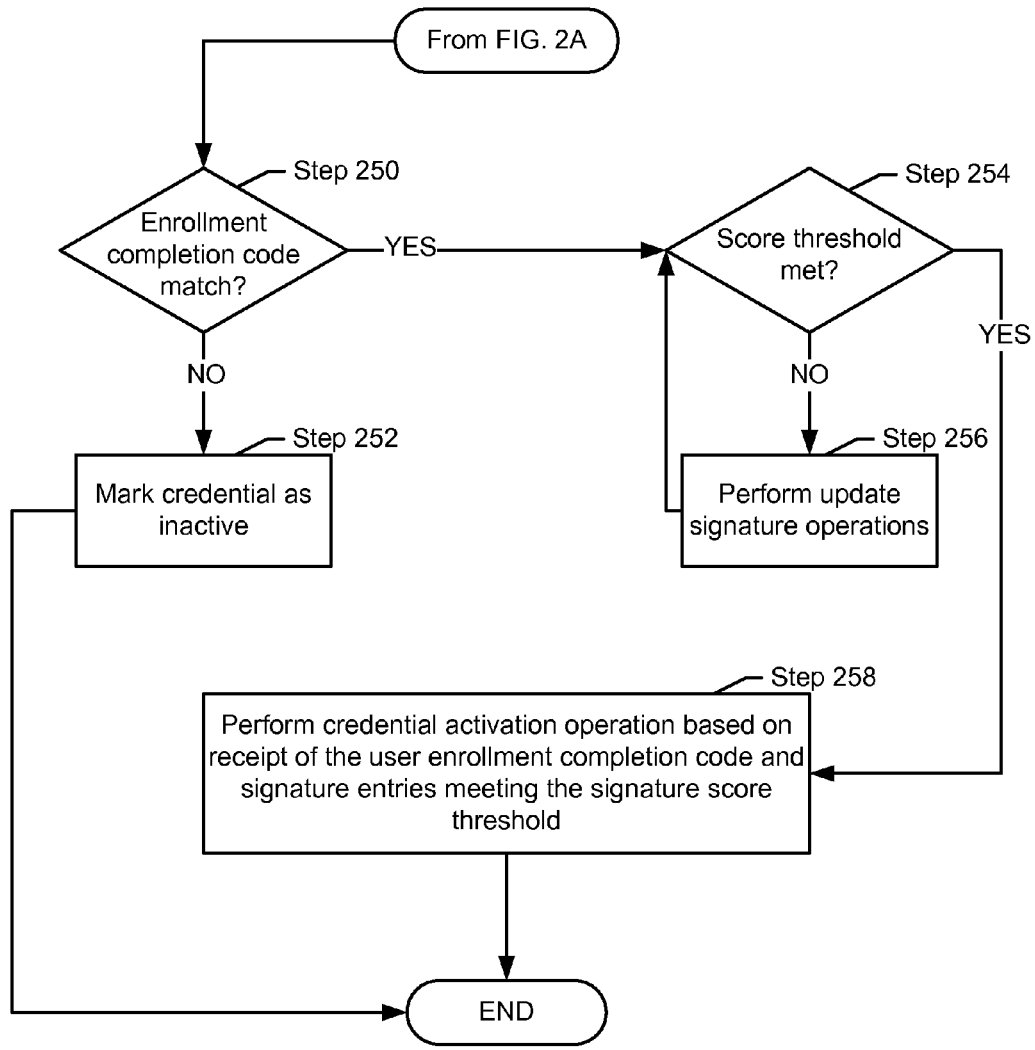

FIG. 2B shows a flowchart describing a method for a portion of a user enrollment process in accordance with one or more embodiments of the invention. In Step 250, the ledger performs a comparison to determine if the enrollment completion code received in Step 220 of FIG. 2A matches the enrollment completion code stored in the ledger repository in Step 216 of FIG. 2A. For example, if the enrollment completion code is a character string, the ledger may use a comparison algorithm to determine whether the two character strings match one another. In one or more embodiments of the invention, if the enrollment verification code match is successful, the process proceeds to Step 254. If, on the other hand, the enrollment verification code match is not successful, the process proceeds to step 252.

In Step 252, the credential is marked as inactive, after which the enrollment process ends with the user not fully enrolled and able to use the encrypted credential for user authentication. Marking the credential as inactive may include storing a marker in the ledger repository, associated with the user metadata, which includes an indication that the credential associated with the user is in an inactive state. In one or more embodiments of the invention, if the enrollment completion code provided by the user does not match, the user may be prompted some number of times to re-transmit the enrollment completion code. In such an embodiment of the invention, the credential may be marked as inactive after the user fails to provide a matching enrollment completion code within the set number of retries. The number of allowed retries may be set as a policy by the resource control entity.

Continuing with Step 254, in Step 254 the ledger makes a determination as to whether a score threshold associated with a resource is met. A score threshold may be set as a policy by the resource control entity and provided to the ledger and/or to the credential application. A score threshold may define the minimum score required to access a given resource. A score may be assigned to each factor of authentication that a resource control entity, as a policy, communicates to a ledger to use when creating a credential related to accessing a given resource. As previously mentioned, a user may provide to the ledger, via the credential application, a signature corresponding to each required factor of authentication. Each signature may be provided along with an associated score assigned to the signature by the credential application based on the scoring policy of a resource control entity. In one or more embodiments of the invention, the ledger may add the signatures and associated scores as signature entries to the credential, which is encrypted using a PPK and returned to the credential application of the user. Accordingly, to determine if a signature score threshold is met, the ledger may obtain the signature entry scores of the credential and add the scores to obtain a total possible score represented by the signature entries of the credential. The total score represented by the signature entries of the credential may then be compared with the required minimum score threshold set by the policy of the resource control entity for accessing a given resource. In one or more embodiments of the invention, if the score threshold is not met by the total score represented by the signature entries of the credential, the process proceeds to Step 256. In one or more embodiments of the invention, if the score threshold for accessing a resource is met, the process proceeds to Step 258.

Continuing with Step 256, in Step 256 the ledger corresponds with the credential application to perform one or more signature update operations. In one or more embodiments of the invention, a signature update operation may include having the credential application prompt a user to provide signatures corresponding to additional factors of authentication. A signature update operation may include having the credential application prompt the user to update one or more previously provided signatures to updated signatures that are worth more points per the scoring policy set by the resource control entity. For example, the user may be prompted to update a password to include more characters and/or one or more non-alphabetic characters. In one or more embodiments of the invention, the ledger incorporates the updated signatures as updated signature entries that are a part of an updated credential. In one or more embodiments of the invention, once the signature update operations are completed, the process returns to Step 254 to determine if the total score represented by the signature entries of the updated credential meet the signature score threshold for accessing a given resource. In one or more embodiments of the invention, the ledger includes functionality to perform signature update operations some quantity of times for a given user, with the quantity of retries set as a policy by the resource control entity. If the total score represented by the signature entries of the credential does not meet or exceed the signature score threshold within the number of retries, the ledger may mark the credential as inactive and the process may end.

Turning to Step 258, in Step 258 the ledger performs a credential activation operation in response to receipt of a valid user enrollment completion code and the determination made in step 254 that the signature score threshold for a given resource is met or exceeded by the total possible score represented by the signature entries of the credential. In one or more embodiments of the invention, the credential activation process may include transmitting additional UTKs to the user for use in encrypting signatures sent to the ledger as a part of a user authentication process. In such embodiments of the invention, the LTKs corresponding to the UTKs may be stored in the ledger repository associated with the user metadata. Once the credential is marked as active, the credential is ready for use in a user authentication process when a user attempts to access a resource, and the enrollment process ends.

Figure 3A:
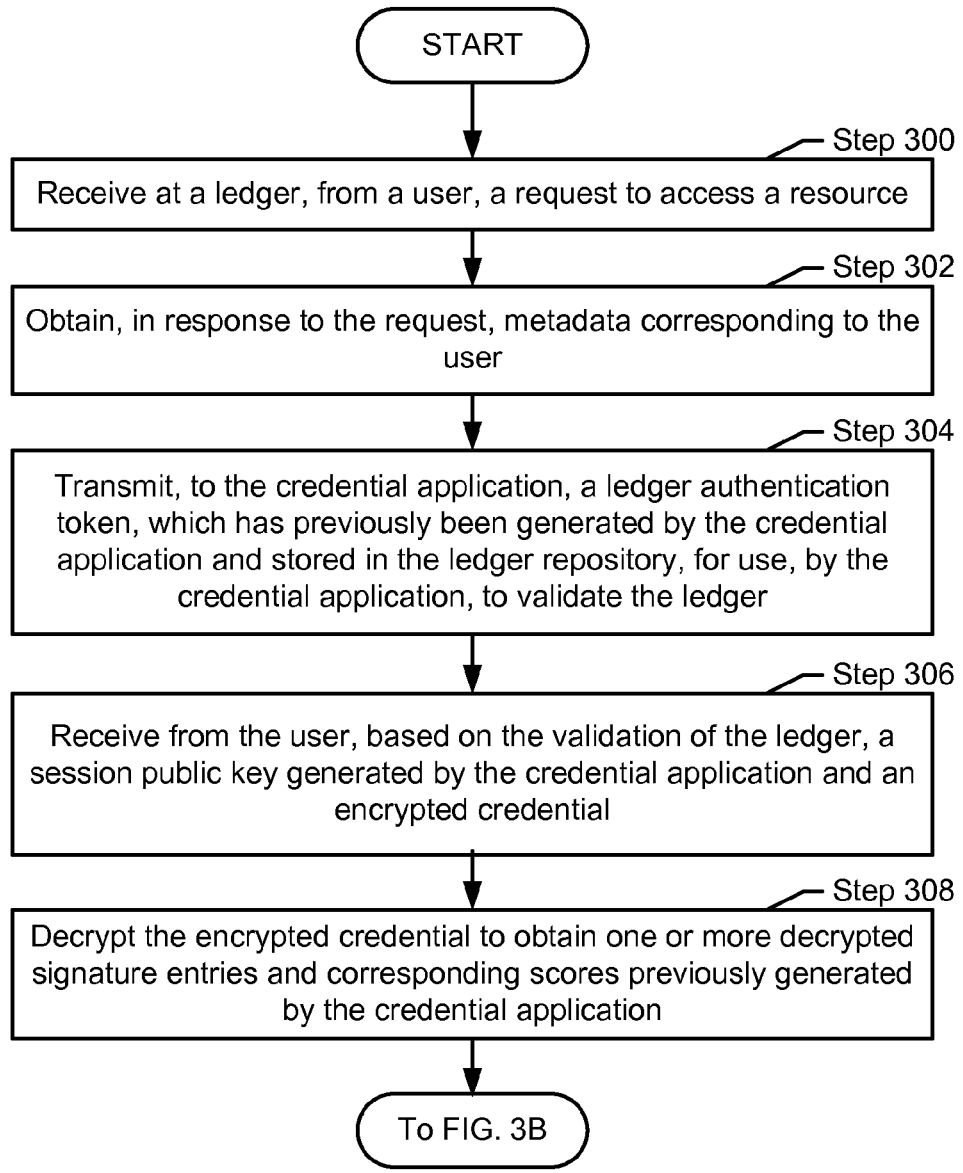

FIG. 3A shows a flowchart describing a portion of a method for authenticating a user to access a resource in accordance with one or more embodiments of the invention. In Step 300, a ledger receives a request to access a resource from a user. The request may be received from a user device of the user. For example, the request may be generated by the credential application and transmitted to a credential reader interface wirelessly, and the credential reader interface may, in turn, transmit the request to the ledger. In other embodiments of the invention, the request may be received from a user indirectly via a resource control entity. For example, the user may request access to a secure website, and the resource control entity associated with the website may transmit the request to the ledger. In one or more embodiments of the invention, the request includes an organizational synonym.

In Step 302, in response to receiving the request, the ledger obtains user metadata corresponding to the user that generated the request to access the resource. For example, after recognition of an organizational synonym received as a part of the request in Step 300, the ledger may obtain a user synonym and/or ledger cluster synonym. In one or more embodiments of the invention, the user synonym is used to locate the user metadata in the ledger repository. In one or more embodiments of the invention, the ledger may not include the user metadata. In such embodiments of the invention, the ledger may include functionality to use the organizational synonym and/or the ledger cluster synonym to determine if one or more other ledgers include the user metadata, in which case the user metadata and other associated data may be obtained from the one or more other ledgers and stored in the ledger at which the request to access the resource is received.

In Step 304, the ledger transmits a LAT to the credential application. In one or more embodiments of the invention, the LAT may be transmitted using any method of conveying data between entities. For example, the LAT may be provided to the credential application via a credential reader interface. In one or more embodiments of the invention, the credential application uses the LAT to determine that the purported ledger is an authentic ledger before interacting any further with the ledger in a user authentication process. Although not shown in FIG. 3, if the credential application does not receive a LAT matching the LAT previously generated by the credential application and received and stored by the ledger in Step 218 of FIG. 2A, then the user authentication process may end, as the credential application is unable to verify the authenticity of the ledger.

In Step 306, based on the credential application's validation of the ledger using the LAT, the ledger receives an encrypted credential from the credential application of the user. In one or more embodiments of the invention, the user and/or credential application may initiate the transfer of the encrypted credential to the ledger from the credential application (e.g., via a credential reader interface). In other embodiments of the invention, the credential application may send a notification to the ledger accepting the ledger as authentic based on the LAT, and in response the ledger initiates a transaction to obtain the encrypted credential from the credential application of the user. In addition to transmitting an encrypted credential to the ledger, the credential application may additionally generate a session key pair, including a session public key and a session private key. The session public key may be transmitted to the ledger for use in encrypting communication sent from the ledger to the credential application during a given user authentication session. The session private key may be stored by the credential application on the user device and used for decrypting communication from the ledger that is encrypted using the session public key. In one or more embodiments of the invention, the credential is obtained from the credential application using any method of conveying data. For example, the encrypted credential may be obtained via, at least in part, a network. As another example, the encrypted credential may be obtained from the credential application using a wireless transmission technology such as Bluetooth LE.

In Step 308, the ledger decrypts the encrypted credential received in Step 306. In one or more embodiments of the invention, decrypting the credential includes obtaining the one or more PSKs corresponding to the one or more PPKs used previously to encrypt the credential. The one or more PSKs may be stored in the ledger repository and associated with user metadata corresponding to the user requesting to access a resource. Once the one or more PSKs are obtained, the ledger may use the one or more PSKs to decrypt the credential, and the process proceeds to FIG. 3B.

Figure 3B:
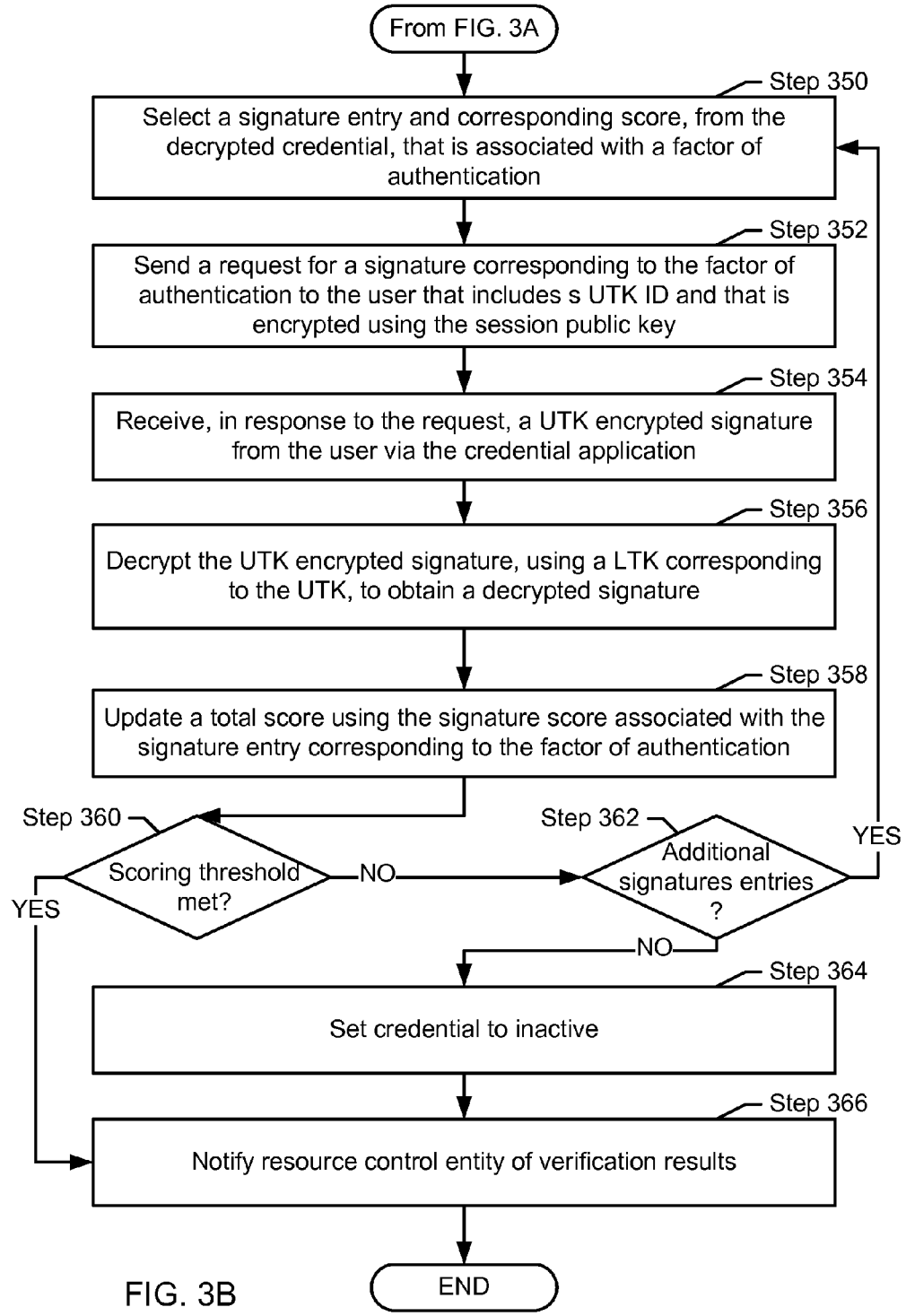

FIG. 3B shows a flowchart describing a portion of a method for authenticating a user to access a resource in accordance with one or more embodiments of the invention. In Step 350, the ledger selects from the decrypted credential (i.e., the credential decrypted in Step 308 of FIG. 3A) a signature entry and associated score corresponding to a factor of authentication selected by a resource control entity for use in authenticating a user to access a resource that the user seeks to access. The ledger may select a signature entry based on any selection criteria. For example, the ledger may select a signature entry based on a policy set by the resource control entity that defines a preferred order of factors of authentication. As another example, the ledger may randomly select a signature entry from the decrypted credential from among the signature entries corresponding to one of the factors of authentication associated with accessing the resource that the user seeks to access.

In Step 352, the ledger sends the user a request for a signature corresponding to the factor of authentication associated with the signature entry selected in Step 350, along with a UTK identifier that identifies to the credential application a UTK for use in encrypting the signature. In one or more embodiments of the invention, the request for a signature may be conveyed to the user using any means of transmitting data. For example, the ledger may send the request to the credential application of the user, which, in turn, may prompt the user to provide the signature. For example, the credential application may prompt the user to enter a password based on receipt of a request for a signature corresponding to a password factor of authentication.

In Step 354, in response to the request for a signature, the ledger receives an encrypted signature from the user. In one or more embodiments of the invention, the encrypted signature may be received via any means of communicating data. For example, the credential application of a user may receive a signature from the user in response to a prompt for the signature, encrypt the signature using a previously provided UTK, and transmit the encrypted signature to the ledger via a network, or via a device-to-device connection between the user device and a credential reader interface operatively connected to the transaction authentication system. In one or more embodiments of the invention, the signature is received along with a UTK identifier that may be used to identify the UTK used to encrypt the signature.

In Step 356, the ledger decrypts the signature received in Step 354. In one or more embodiments of the invention, decrypting the signature includes retrieving a LTK, from the ledger repository, associated with user metadata corresponding to the user requesting access to a resource. The LTK may be retrieved, at least in part, using a UTK identifier received with the signature. In one or more embodiments of the invention, the LTK is used to perform the decryption of the signature.

In Step 358, the ledger obtains the score associated with the signature entry corresponding to the factor of authentication to which the decrypted signature also corresponds. The score may be located in and obtained from the decrypted credential. Once the ledger has obtained a score associated with the signature, the ledger may update a total score that represents a sum of all the scores relating to signatures that verified during the instant attempt by the user to gain access to the resource.

In Step 360, a determination is made as to whether a scoring threshold associated with the resource a user is attempting to access is met or exceeded. In one or more embodiments of the invention, the total score obtained by the ledger in Step 358 is compared with a scoring threshold set for a resource by a resource control entity to determine if the total score meets or exceeds the scoring threshold. In one or more embodiments of the invention, the threshold set for a given resource may depend, at least in part, on the level of security desired by the resource control entity for the resource. In one or more embodiments of the invention, if the total score does not meet or exceed the scoring threshold, the process proceeds to Step 362. In one or more embodiments of the invention, if the total score does meet or exceed the scoring threshold, the process proceeds to Step 366.

In Step 362, the ledger makes a determination as to whether there are any additional signature entries in the credential corresponding to a factor of authentication that has not yet been verified via comparison with a signature obtained from the user. In one or more embodiments of the invention, if there are additional signature entries, the process returns to Step 350, and an additional signature entry and signature obtained from the user are used to verify an additional factor of authentication, score the signature, and add the score to the total score. In one or more embodiments of the invention, if there are no additional signature entries in the credential, the process proceeds to Step 364.

In Step 364, in response to a failed attempt to authenticate a user to access a resource, the credential corresponding to the user is marked as inactive. In one or more embodiments of the invention, marking a credential as inactive includes storing an inactive marker in the ledger repository associated with the user metadata. In one or more embodiments of the invention, a user may not use a credential to access a resource when the credential is marked as inactive. Once a credential is marked as inactive, a user must request that the credential be reset. Credential reset is discussed further in the description of FIG. 5, below.

In Step 366, the ledger notifies the resource control entity of the results of the attempted user verification. In one or more embodiments of the invention, if the scoring threshold has been met, the ledger may inform the resource control entity that the verification was successful. In one or more embodiments of the invention, if the scoring threshold is not met, then the ledger may notify the resource control entity of the failed attempted to authenticate the user. In one or more embodiments of the invention, the resource control entity decides to grant or deny a user access to a resource based, at least in part, on the notification received from the ledger regarding the user verification results. The verification results notification may be transmitted using any means of conveying data to the resource control entity.

Figure 4:
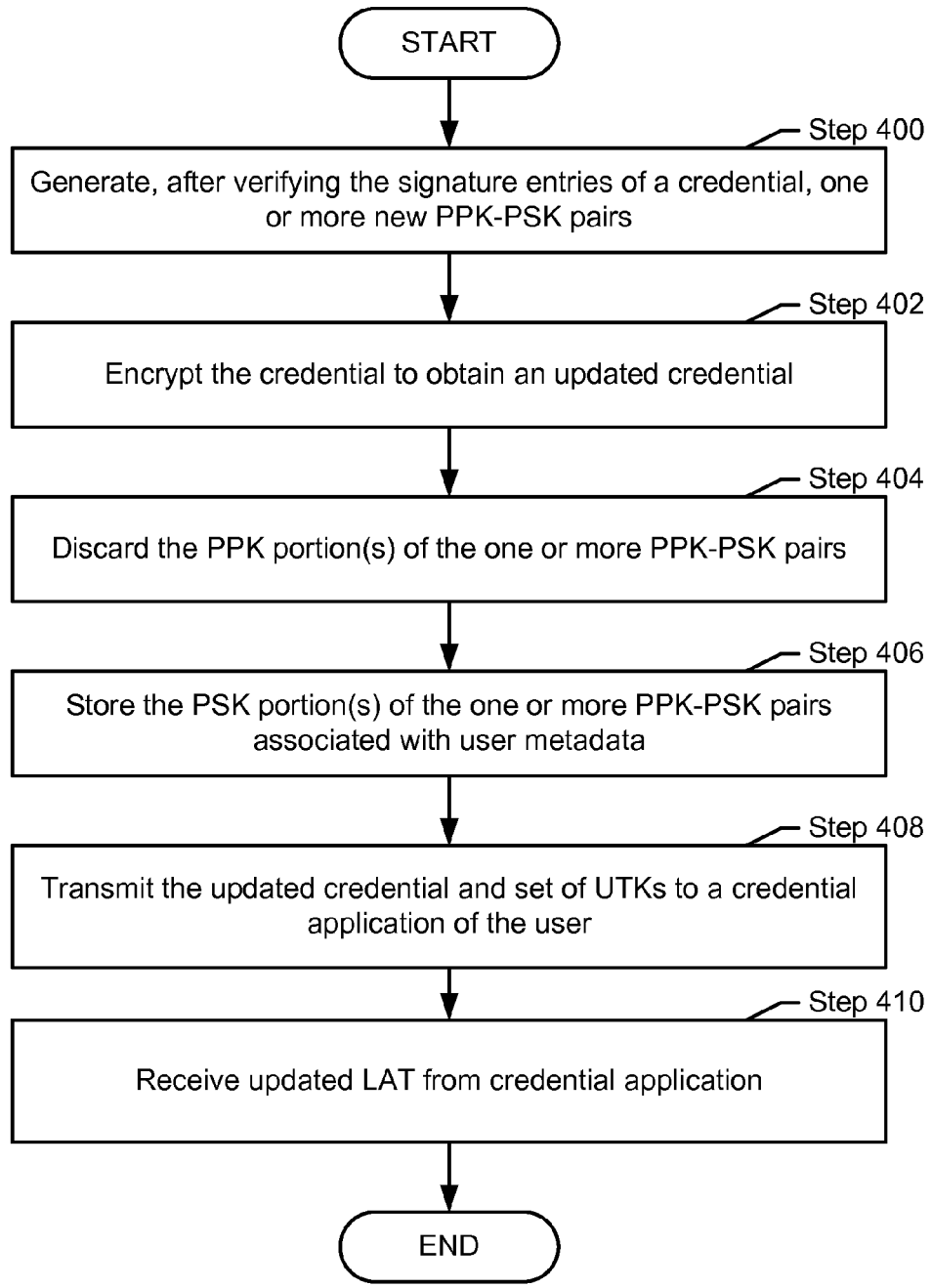

FIG. 4 shows a flowchart describing a method for updating credential encryption in accordance with one or more embodiments of the invention. In Step 400, the ledger generates one or more new PPK-PSK pairs. In one or more embodiments of the invention, after a user has successfully been authenticated to access a resource via verification of one or more signature entries of a decrypted credential, the ledger performs one or more key pair generations to obtain one or more new PPK-PSK pairs for use in re-encrypting and, sometime later, decrypting a credential.

In Step 402, the ledger performs an encryption of the credential. In one or more embodiments of the invention, the credential that was decrypted in Step 308 of FIG. 3A is encrypted using one or more PPK-PSK pairs generated in Step 400. In one or more embodiments of the invention, the entire credential is re-encrypted using a single PPK of a single PPK-PSK pair. In other embodiments of the invention, the ledger encrypts one or more signature entries and the other user data of a credential using different public key portions of the one or more new PPK-PSK pairs to obtain new encrypted signature entries and user data of a credential.

In Step 404, the one or more PPKs used to encrypt at least a portion of the credential in Step 402 are discarded from the ledger. In one or more embodiments of the invention, discarding the PPKs from the ledger includes deleting from storage media and/or memory accessible to the ledger any copy of the PPK.

In Step 406, the one or more PSKs associated with the one or more PPKs discarded in Step 404 are stored (e.g., in a ledger repository) associated with user metadata corresponding to the user that was previously authenticated to access the resource. In one or more embodiments of the invention, storing the PSKs includes modifying a storage medium to include the PSKs in a computer readable format.

In Step 408, the updated credential is transmitted to the credential application of the user. In one or more embodiments of the invention, the updated credential is transmitted using any means of conveying data. For example, the updated credential may be conveyed to the credential application via Bluetooth LE connection. Additionally, after the updated credential is transmitted to the credential application, the ledger may send an updated set of UTKs to the credential application.

In Step 410, an updated LAT is received from the credential application. In one or more embodiments of the invention, the credential application may send an updated LAT to the ledger after hashing and encrypting a new LAT based on data that is different than the previously sent LAT.

Figure 5:
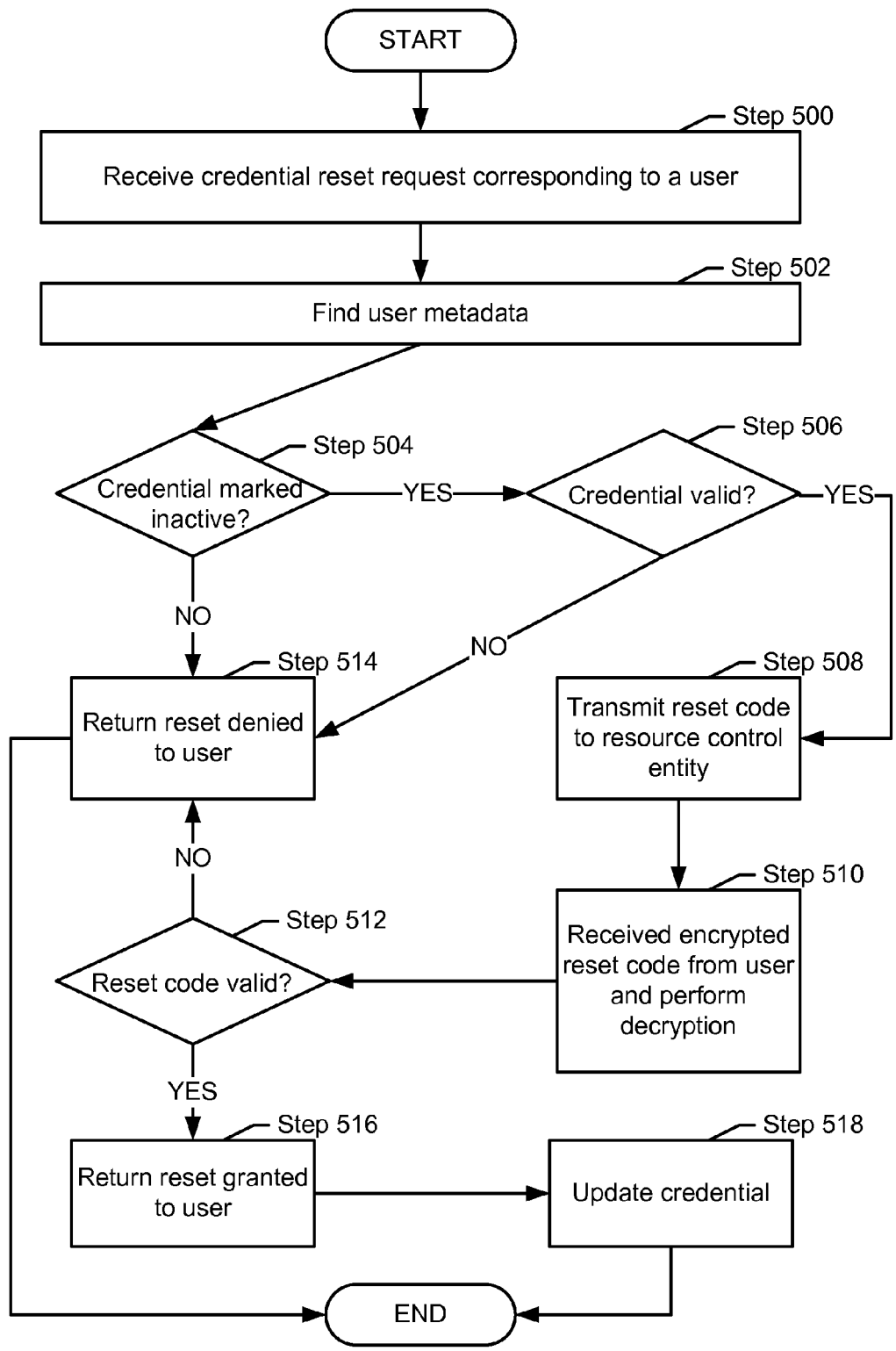

FIG. 5 shows a flowchart describing a method for resetting a credential in accordance with one or more embodiments of the invention. In Step 500, a credential reset corresponding to a user is received by the ledger. In one or more embodiments of the invention, the credential reset request is received from the resource control entity, which received the request from the user. In one or more embodiments of the invention, the resource control entity sends a reset required notification to a user when a credential is marked inactive. In response, the resource control entity may receive a reset request from the user, which is conveyed to the ledger. In one or more embodiments of the invention, the request includes a user synonym (e.g., user identifier).

In Step 502, the ledger finds user metadata in response to receiving the reset request. In one or more embodiments of the invention, a user synonym included in the reset request is used to locate user metadata in a ledger repository.

In Step 504, the ledger makes a determination as to whether the credential is currently marked as inactive. In one or more embodiments of the invention, determining whether a credential is marked as inactive includes determining if a marker indicating that the credential is inactive has been associated (e.g., in Step 364 of FIG. 3B) with the user metadata by the ledger. In one or more embodiments of the invention, if the credential corresponding to the user is not marked as inactive, the process proceeds to Step 514. In one or more embodiments of the invention, if the credential corresponding to the user is marked as inactive, the process proceeds to Step 506.

In Step 506, the ledger makes a determination as to whether a credential is a valid credential. In one or more embodiments of the invention, a valid credential is a credential that has been an active credential sometime previously. In one or more embodiments of the invention, a valid credential may be, for example, a credential that has been active within a given time period before the present time. In one or more embodiments of the invention, if the credential is not a valid credential, the process proceeds to Step 514. If the credential is a valid credential, the process may proceed to Step 508.

In Step 508, in response to receiving a credential reset request corresponding to a credential that is marked as inactive, but is a valid credential, the ledger transmits a reset code towards a user. In one or more embodiments of the invention, the reset code is first transmitted to the resource control entity, which relays the reset code to the user (e.g., via a network). In such embodiments of the invention, although not shown in FIG. 5, the transmission of the reset code to the resource control entity provides the resource control entity an additional opportunity to deny the reset request for any reason.

In Step 510, the ledger receives and decrypts an encrypted reset code from the credential application of the user requesting a reset of the credential. In one or more embodiments of the invention, the reset code is encrypted using a UTK previously provided to the credential application, and is sent along with a UTK identifier selected by the ledger. The ledger may use the UTK identifier to locate an LTK associated with user metadata corresponding to the user for use in decrypting the reset code. Although not shown in FIG. 5, if the ledger is unable to identify an LTK associated with the user metadata that corresponds to the UTK used to encrypt the reset code, then the process may proceed to Step 514 (discussed below).

In Step 512, the ledger makes a determination as to whether the reset code decrypted in Step 510 is a valid reset code. The determination may be made, at least in part, by performing a comparison between the decrypted reset code received from the user and the reset code transmitted to the resource control entity, a copy of which may be stored in the ledger repository. In one or more embodiments of the invention, the reset code is a valid reset code if it matches the reset code transmitted to the resource control entity in Step 508. In one or more embodiments of the invention, if the reset key is not valid, the process proceeds to Step 514. In one or more embodiments of the invention, if the reset code is valid, the process proceeds to Step 516.

In Step 514, a reset denied notification is returned to the user via any means of conveying data, and the process ends with the credential reset attempt having failed.

In Step 516, a reset granted notification is returned to the user via any means of conveying data. In Step 518, the ledger begins the process of updating the credential. Updating the credential may include, but is not limited to, requesting the user to provide updated signatures, asking the user to provide additional or stronger signatures, beginning the enrollment process again, and/or any other form of updating the credential. In one or more embodiments of the invention, updating the credential also includes removing the inactive marker previously associated with the user metadata in the ledger repository.

Figure 6:
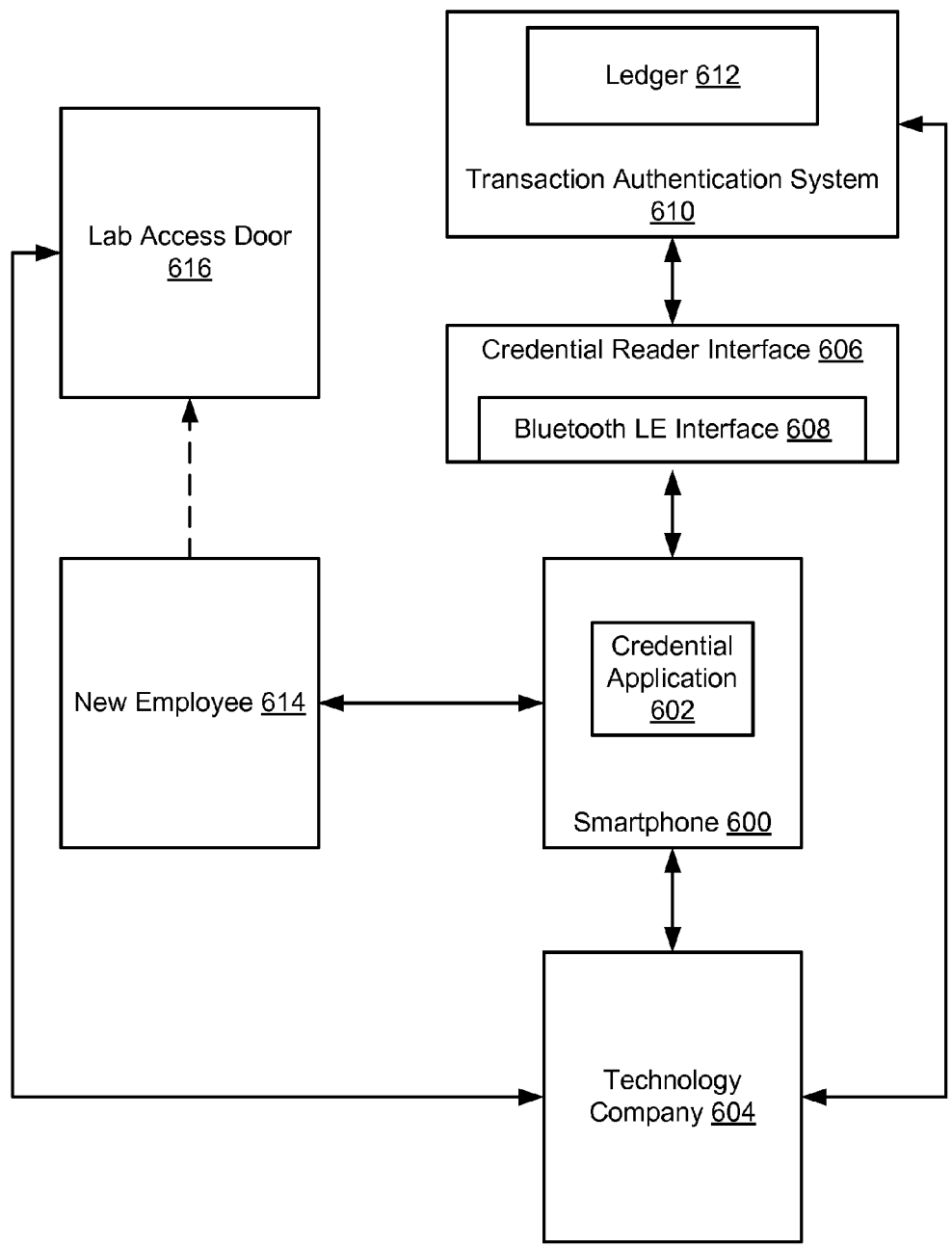
FIG. 6 and FIG. 7 show examples in accordance with one or more embodiments of the invention.

FIG. 6 shows an example in accordance with one or more embodiments of the invention. The following example is for explanatory purposes only and not intended to limit the scope of the invention.

Referring to FIG. 6, consider a scenario in which Technology Company (604) has hired a new employee (614). The new employee requires access to several laboratories in order to perform the new job. The laboratories may be accessed via a lab access door (616). Technology Company (604) acts as the resource control entity, controlling access to the resource which, in the present example, is a laboratory. Access is controlled via a lock on the lab access door (616) that may be opened only when an employee of Technology Company undergoes a user authentication process using a credential. Technology Company (604) has set a policy that lab access requires verification of at least two factors of authentication. The policy also indicates that three factors of authentication are allowed, including a password, a fingerprint scan, and voice recognition. The policy sets the score threshold for lab access of at least five points. A valid signature provided corresponding to the voice recognition factor of authentication is worth four points. A valid signature provided corresponding to the fingerprint scan factor of authentication is worth two points. A valid signature provided in response to the password factor of authentication is worth three points if the password is eight or more characters, but only worth one point if seven or less characters. The aforementioned scoring policy has previously been transmitted by Technology Company (604) to the ledger (612) of the transaction authentication system (610) via a network (not shown).

In order to enroll the new employee in the user authentication process, Technology Company (604) sends an enrollment request, corresponding to the new employee (614), to a ledger (612) of a transaction authentication system (610). The enrollment request includes a user identifier and a user email address. The user identifier and user email address are stored in the ledger repository (not shown) as user metadata. In response to the enrollment request, the ledger (612) generates an enrollment invitation, which is transmitted to the new employee (614) via email. At this time, the ledger also generates a partial credential and twenty UTK-LTK pairs, each of which are associated with the user metadata and stored in the ledger repository (not shown).

Once the new employee (614) receives the enrollment invitation, the new employee follows instructions therein to obtain a credential application (602) from an app store (not shown) that provides apps for the new employee's smartphone (600). Once the new employee (614) obtains the credential application (602) and installs it on the new employee's smartphone (600), the new employee sends an indication (e.g., to the ledger via the credential application) that the new employee would like to accept the invitation. Once the invitation has been accepted, the partial credential and the UTK portions of the UTK-LTK pairs are transmitted to the credential application (e.g., via a network). The ledger (612) then stores the LTK portions of the UTK LTK pairs in the ledger repository associated with the user metadata.

After the partial credential and UTKs are received by the credential application (602), the new employee (614) interacts with the credential application executing on the smartphone (600) to provide signatures corresponding to the various aforementioned factors of authentication associated with lab access. To that end, the new employee provides a password signature "ALEH7289!" (for the password factor of authentication), a fingerprint scan signature (for the fingerprint scan factor of authentication) using a fingerprint scanner of the smartphone (600), and a spoken word "edro" signature (for the voice recognition factor of authentication) recorded by audio equipment of the smartphone.

Once the credential application (602) receives the signatures, each signature is encrypted using a different UTK (i.e., three UTKs) of the previously provided UTKs and transmitted to the ledger (612). The UTKs used may be selected based on UTK identifiers previously selected by the ledger. The ledger (612) then locates the appropriate LTKs and uses the LTKs to decrypt the UTK encrypted signatures.

After the signatures are decrypted, the ledger (612) generates a PPK-PSK pair and then creates a credential by adding to the previously generated partial credential user metadata and the three signatures as signature entries. The credential is then encrypted using the PPK, which is discarded from the ledger after the credential has been encrypted. At this time, the credential application may automatically generate a LAT. The LAT may be encrypted using a UTK, sent by the credential application (602) to the ledger, decrypted by the ledger, and stored in the ledger repository associated with the new employee user metadata.

Next, the encrypted credential is transmitted to the credential application (602) and an enrollment completion code is emailed to the new employee (614). The new employee may then provide the enrollment completion code to Technology Company (604), which conveys the enrollment completion code back to the ledger (612). The ledger may then compare the enrollment completion code received from Technology Company with the enrollment completion code previously provided to the new employee to determine that the enrollment completion codes match.

After determining that the enrollment completion codes match, the ledger (612) determines whether the score threshold for lab access may be met by the signatures entries of the credential created for the new employee. To that end, the ledger first obtains and examines the scores of the signature entries in the credential, which were previously generated by the credential application based on a scoring policy of the resource control entity. The voice recognition signature entry is determined to have an associated score of four points, the fingerprint scan signature entry is determined to have an associated score of three points, and the password, being nine characters, is determined to have an associated score of two points. The total possible score represented by the three signature entries is therefore determined to be nine, which exceeds the score threshold of five for lab access. Therefore, the ledger activates the credential, which is now ready for use in accessing the laboratory via the lab access door (616).

Sometime later, the new employee (614) starts work, and needs to go into the lab. To that end, the new employee approaches the lab access door (616), and more specifically the credential reader interface (606) near the lab access door. The credential reader interface includes a Bluetooth LE interface (608) that is configured to perform a proximity range transaction when a Bluetooth enabled device (e.g., smartphone (600)) comes within two feet of the credential reader interface. Therefore, when the new employee presents the smartphone (which is Bluetooth enabled) in front (i.e., within two feet) of the credential reader interface, the credential reader interface automatically begins a user authentication process, with the proximity range transaction acting as the request from the user to access the lab via the lab access door (616). In one or more embodiments of the invention, the user authentication process includes advertising, by the credential application, an organizational synonym to the ledger via the credential reader interface. Once the organizational synonym is recognized by the ledger, the ledger may query the credential application, via the credential reader interface, for a user synonym and a ledger cluster synonym.

Next, the credential application (602) transmits, via the credential reader interface (606), to the ledger (612), the user synonym, which the ledger uses to obtain the user metadata, and the ledger cluster synonym. In the present example, the ledger cluster synonym indicates that the ledger with which the credential interacts is the ledger that includes user metadata corresponding to the new employee. Then the ledger transmits to the credential application the LAT previously generated by the credential application that is associated with the user metadata of the new employee. The credential application validates that the LAT is correct, and therefore that the ledger is an authentic ledger. Based on the LAT validation, the credential application transmits the encrypted credential to the ledger via the Bluetooth LE interface (608) of the credential reader interface.

Once the encrypted credential is received, the ledger (612) uses the PSK associated with the new employee user metadata to decrypt the credential. Next, the ledger randomly selects the password factor of authentication to be verified, and accordingly selects the password signature entry from the decrypted credential. The ledger then transmits to the credential application (602) a request for the new employee (614) to provide the password that also includes a UTK identifier for the credential application to use in selecting a UTK with which to encrypt the password signature provided by the new employee. The new employee provides the password ("ALEH7289!") to the credential application. The credential application encrypts the password signature using a previously provided UTK selected based on the provided UTK identifier, and transmits the encrypted password signature to the ledger via the credential reader interface (606).

The ledger uses the UTK identifier previously sent to the credential application to select the corresponding LTK, which is then used to decrypt the password signature. The password signature is then compared with the password signature entry, and the ledger determines that they match. The ledger then obtains the score associated with the password signature (i.e., two points), which is now the total score achieved by the new employee. The ledger determines that the total score of two does not meet the score threshold for lab access, and so the ledger must select an additional signature entry.

The ledger (612) then selects the voice recognition factor of authentication to be verified, and accordingly selects the voice recognition signature entry from the decrypted credential. The ledger then transmits to the credential application (602) a request for the new employee (614) to provide the voice data, along with a UTK identifier. The new employee speaks the pre-selected phrase ("edro") to the smartphone (600) audio equipment, which conveys the data to the credential application. The credential application encrypts the voice recognition signature using another previously provided UTK based on the received UTK identifier, and transmits the encrypted password signature to the ledger via the credential reader interface (606). The ledger selects the corresponding LTK, which is then used to decrypt the voice recognition signature. The voice recognition signature is then compared with the voice recognition signature entry, and the ledger determines that they match. The ledger then obtains the score associated with the voice recognition signature (i.e., four points), making the total score achieved by the new employee now six. The ledger determines that the total score of six exceeds the score threshold for lab access. Therefore, the ledger notifies Technology Company (604) that the authentication of the new employee was successful. Based on the successful authentication, Technology Company grants the new employee access to the lab by unlocking the lab access door (616).

Once the new employee has been authenticated, the ledger generates a new PPK-PSK pair, re-encrypts the previously decrypted credential using the new PPK of the new PPK-PSK pair, discards the new PPK, transmits the new encrypted credential to the credential application via the credential reader interface, and stores the new PSK corresponding to the new PPK in the ledger repository associated with the new employee user metadata. The credential application then updates the LAT and transmits the LAT to the ledger. Additionally, the ledger generates and provides to the credential application a new set of UTKs for use in the next user authentication.

Figure 7:
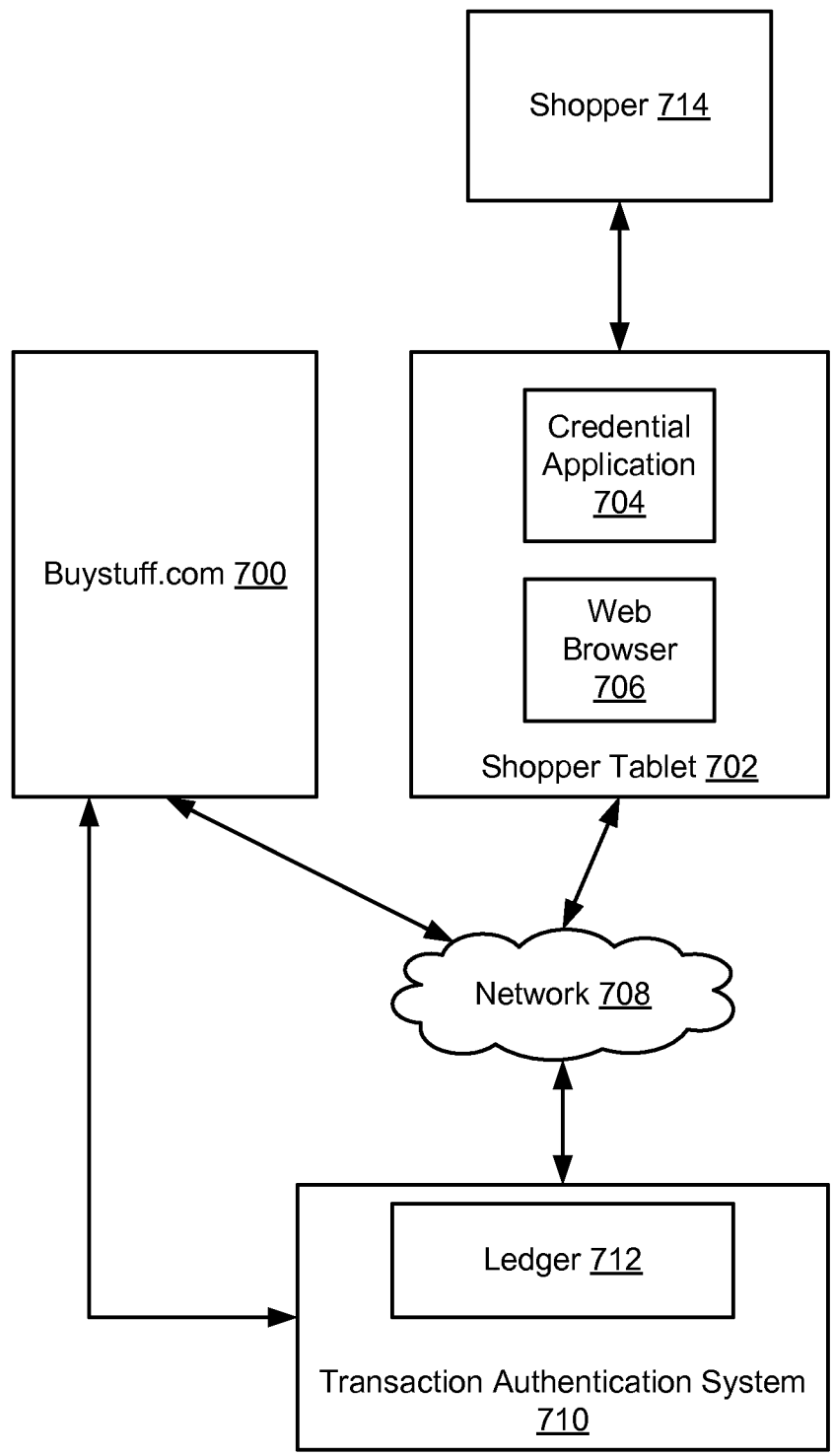

FIG. 7 shows an example in accordance with one or more embodiment of the invention. The following example is for explanatory purposes only and not intended to limit the scope of the invention.

Referring to FIG. 7, consider a scenario in which a shopper (714) has a shopper tablet (702), which is a tablet computing device. The shopper would like to make a purchase from buystuff.com (700), an online sales entity that is a resource control entity requiring user authentication before an online purchase may be made. Buystuff.com has set a policy that online purchase access requires verification of three factors of authentication. The policy also indicates that three factors of authentication are allowed, including a numeric pin code, a motion, and an iris scan. The policy sets the score threshold for online purchase access of at least four points. A valid signature provided corresponding to the numeric pin code factor of authentication is worth one point. A valid signature provided corresponding to the iris scan factor of authentication is worth two points. A valid signature provided in response to the motion factor of authentication is worth two points. The aforementioned scoring policy has previously been transmitted by buystuff.com (700) to the credential application, which used the policy to score the signature entries of the credential, and to the ledger (712) of the transaction authentication system (710) via a network (708).

In the present scenario, the shopper (714) has already been through the enrollment process, and therefore already has a credential application (704) and an encrypted credential (not shown) is already stored on the shopper tablet (702). The encrypted credential includes an iris scan signature entry, a numeric pin code signature entry, a motion signature entry, and user credit card information for use in making online purchases.

Sometime after enrollment, the shopper (714) uses a web browser (706) on the shopper tablet (702) to browse to the website of buystuff.com (700), and elects to make a purchase. To that end, the shopper provides an email address to buystuff.com. Buystuff.com conveys the email address to the ledger (712), which uses the email address of the shopper to locate the user metadata in the ledger repository (not shown). The ledger then transmits a transaction request to the credential application indicating that buystuff.com is requesting an authentication, which is conveyed to the shopper. Once the shopper responds affirmatively, the ledger transmits to the credential application (704) the LAT previously generated by the credential application and that is associated with the user metadata of the shopper. The credential application validates that the LAT is correct, and therefore that the ledger is an authentic ledger. Based on the LAT validation, the credential application transmits the encrypted credential to the ledger via the network (708).

Once the encrypted credential is received, the ledger uses the PSK associated with the shopper user metadata to decrypt the credential. Next, the ledger randomly selects the numeric pin factor of authentication to be verified, and accordingly selects the numeric pin signature entry from the decrypted credential. The ledger then transmits to the credential application a request for the shopper to provide the numeric pin, along with a UTK identifier. The shopper provides the numeric pin ("20708191") to the credential application. The credential application encrypts the numeric pin signature using a previously provided UTK (selected based on the received UTK identifier), and transmits the encrypted numeric pin signature and to the ledger via the network. The ledger selects the LTK corresponding to the UTK, which is then used to decrypt the numeric pin signature. The numeric pin signature is then compared with the numeric pin signature entry of the decrypted credential, and the ledger determines that they match. The ledger then determines that the numeric pin signature is worth one point, which is now the total score achieved by the shopper. The ledger determines that the total score of one does not meet the score threshold for making an online purchase from buystuff.com, and so the ledger must select an additional signature entry.

The ledger then selects the iris scan factor of authentication to be verified, and accordingly selects the iris scan signature entry from the decrypted credential. The ledger then transmits to the credential application a request for the shopper to provide an iris scan, along with another UTK identifier. The shopper uses the iris scan equipment of the shopper tablet to take an iris scan, which is conveyed as data to the credential application. The credential application encrypts the iris scan signature using another previously provided UTK, and transmits the encrypted iris scan signature to the ledger via the network. The ledger uses the UTK identifier to select the LTK corresponding to the UTK, which is then used to decrypt the iris scan signature. The iris scan signature is then compared with the iris scan signature entry, and the ledger determines that they match. The ledger then determines that the iris scan signature is worth two points, making the total score achieved by the shopper now three. The ledger determines that the total score of three does not meet the score threshold for making an online purchase from buystuff.com, and so the ledger must select an additional signature entry.

The ledger then selects the motion factor of authentication to be verified, and accordingly selects the motion signature entry from the decrypted credential. The ledger then transmits to the credential application a request for the shopper to provide motion data, along with a UTK identifier. The shopper uses the motion detection equipment of the shopper tablet to generate motion data, which is conveyed to the credential application. The credential application encrypts the motion signature using another previously provided UTK, and transmits the encrypted motion signature and another UTK identifier to the ledger via the network. The ledger uses the UTK identifier to select the corresponding LTK, which is then used to decrypt the motion signature. The motion signature is then compared with the motion signature entry, and the ledger determines that they match. The ledger then determines, based on the score previously generated by the credential application for the motion signature, that the motion signature is worth two points, making the total score achieved by the shopper now five. The ledger determines that the total score of five exceeds the score threshold (i.e., four) for making an online purchase. Therefore, the ledger notifies buystuff.com that the authentication of the shopper was successful. Based on the successful authentication, buystuff.com grants the shopper access to making an online purchase, and obtains the credit card information (e.g., in an encrypted package) of the shopper from the ledger when the shopper chooses to pay for items from buystuff.com.

Once the shopper has been authenticated, the ledger generates a new PPK-PSK pair, re-encrypts the previously decrypted credential using the new PPK of the new PPK-PSK pair, discards the new PPK, transmits the new encrypted credential to the credential application via the network, and stores the new PSK corresponding to the new PPK in the ledger repository associated with the shopper user metadata. The credential application then updates the LAT and transmits the LAT to the ledger. Additionally, the ledger generates and provides to the credential application a new set of UTKs for use in the next user authentication.

Figure 8:
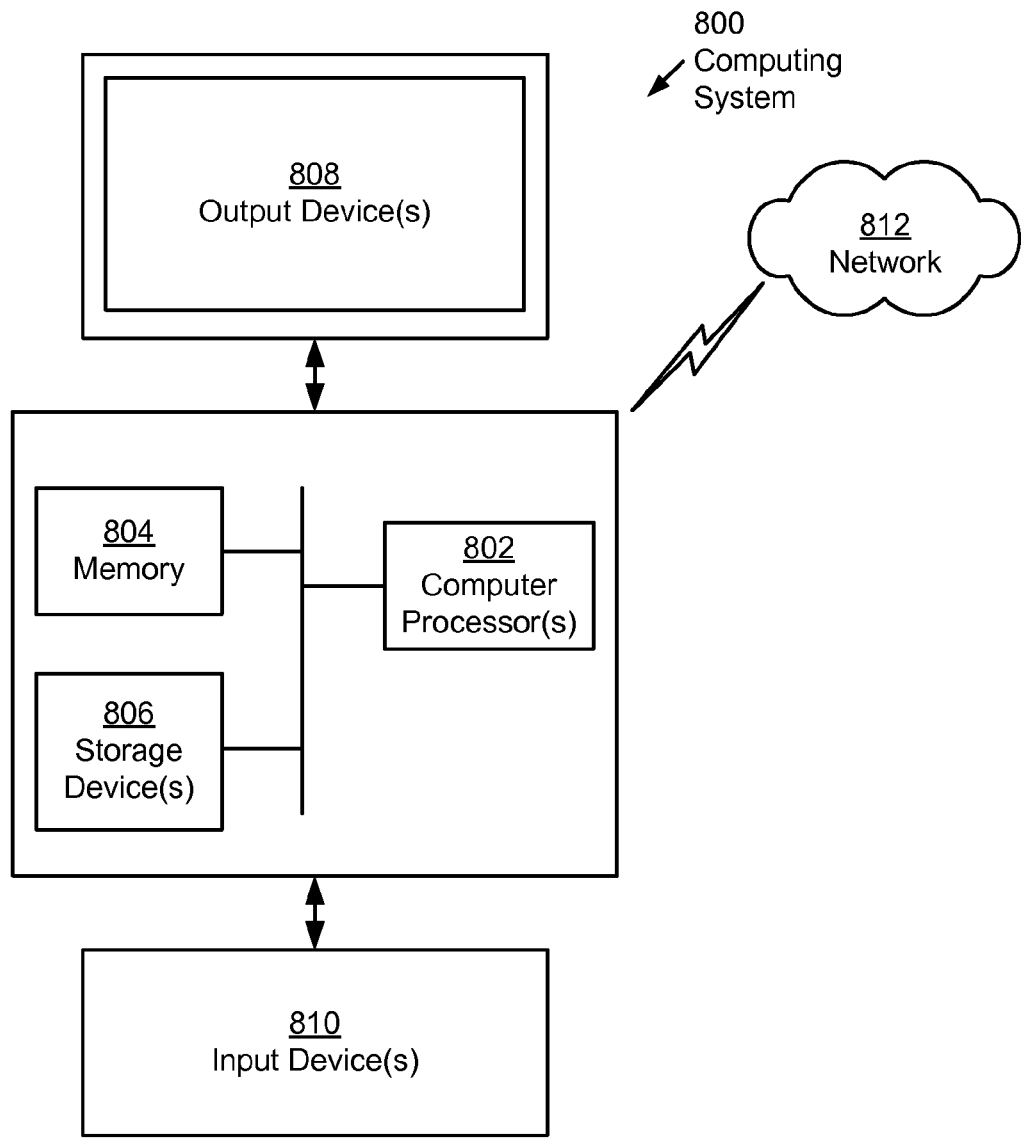
FIG. 8 shows a computing system in accordance with one or more embodiments of the invention.

Embodiments of the invention may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, camera, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (800) may be located at a remote location and connected to the other elements over a network (812). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing a resource comprising:
   receiving, by a ledger device, a request, corresponding to a user, to access the resource, wherein the resource is associated with a resource control entity;
   in response to the request, obtaining user metadata corresponding to the user;
   sending, to a user device of the user, a ledger authentication token (LAT), wherein a credential application, executing on the user device, uses the LAT to verify that the ledger device is a valid ledger;
   receiving, from the credential application, an encrypted payload comprising a plurality of signature entries, wherein the encrypted payload is encrypted using a payload public key (PPK);
   decrypting, by the ledger device, the encrypted payload using a payload secret key (PSK) to obtain the plurality of signature entries and other user data;
   obtaining results of a verification by successively verifying each of the plurality of signature entries until a scoring threshold associated with the resource is at least met; and
   transmitting, to the resource control entity, a notification comprising the results of the verification, wherein the resource control entity uses the results of the verification to determine whether to grant the user access to the resource;
   generating a new PPK-PSK pair comprising a new PPK and a new PSK;
   encrypting the plurality of signature entries with the new PPK to obtain a new encrypted payload, wherein the new encrypted payload is generated when successively verifying each of the plurality of signature entries;
   discarding the new PPK;
   associating the new PSK with the user metadata; and
   sending the new encrypted payload to the credential application.

2. The method of claim 1, further comprising:
   generating a plurality of new user transaction pre-key (UTK)—ledger transaction pre-key (LTK) pairs comprising a plurality of new UTKs and a plurality of new LTKs;
   sending the plurality of new UTKs to the credential application;
   receiving a new encrypted LAT from the credential application, wherein the new encrypted LAT comprises a new LAT that is encrypted using one of the plurality of new UTKs, and wherein the new LAT is distinct from the LAT;
   decrypting the new encrypted LAT using a corresponding one of the plurality of new LTKs to obtain the new LAT;
   storing the new LAT in a ledger repository; and
   associating the new LAT with the user metadata.

3. The method of claim 1, wherein obtaining the user metadata comprises:
   performing a proximity range transaction in order to verify that the credential application is executing on the user device that is within a predefined distance from the ledger device;
   determining, after verifying that the user device is within the predefined range, that the user metadata is not located on the ledger device; and
   based on the determination that the user metadata is not located on the ledger device, obtaining the user metadata from a second ledger device,
      wherein the credential application provides a ledger cluster synonym, an organizational synonym, and a user synonym to the ledger device as part of the proximity range transaction,
      wherein the organizational synonym is used to determine an organization to communicate with,
      wherein the ledger cluster synonym is used to determine that the user metadata is not located on the ledger device, and
      wherein the user synonym is used to identify the user metadata on the second ledger device.

4. The method of claim 3, wherein the ledger cluster synonym identifies the ledger device on which the user metadata resides.

5. The method of claim 1, wherein successively verifying each of the plurality of signature entries until the scoring threshold associated with the resource is at least met comprises:
   sending a UTK ID to the credential application;

receiving an encrypted signature from the credential application, wherein the signature is encrypted using a UTK corresponding to the UTK ID; and decrypting the encrypted signature using a LTK, wherein the UTK and the LTK form an asymmetric key pair.

6. The method of claim 1, wherein the user metadata comprises the PSK, the LAT, and a set of ledger transaction keys (LTKs) corresponding to a set of user transaction keys (UTKs).

7. A method for accessing a resource comprising:

receiving, by a ledger device, a request, corresponding to a user, to access the resource, wherein the resource is associated with a resource control entity;

in response to the request, obtaining user metadata corresponding to the user;

sending, to a user device of the user, a ledger authentication token (LAT), wherein a credential application, executing on the user device, uses the LAT to verify that the ledger device is a valid ledger;

receiving, from the credential application, an encrypted payload comprising a plurality of signature entries, wherein the encrypted payload is encrypted using a payload public key (PPK);

decrypting, by the ledger device, the encrypted payload using a payload secret key (PSK) to obtain the plurality of signature entries and other user data;

obtaining results of a verification by successively verifying each of the plurality of signature entries until a scoring threshold associated with the resource is at least met; and transmitting, to the resource control entity, a notification comprising the results of the verification, wherein the resource control entity uses the results of the verification to determine whether to grant the user access to the resource;

generating a plurality of new PPK-PSK pairs comprising a plurality of new PPKs and a plurality of new PSKs;

encrypting each of the plurality of signature entries with a different one of the plurality of new PPKs to obtain a plurality of encrypted signature entries, wherein the plurality of encrypted signature entries are generated when successively verifying each of the plurality of signature entries;

discarding the plurality of new PPKs;

associating each of the plurality of the new PSKs with the user metadata; and sending each of the plurality of encrypted signature entries to the credential application.

8. A system for accessing a resource comprising:

a ledger device operatively connected to a user device of a user and to a resource control entity and configured to:

receive a request, corresponding to the user, to access the resource, wherein the resource is associated with the resource control entity;

in response to the request, obtain user metadata corresponding to the user;

send, to the user device, a ledger authentication token (LAT), wherein a credential application, executing on the user device, uses the LAT to verify that the ledger device is a valid ledger;

receive, from the credential application, an encrypted payload comprising a plurality of signature entries, wherein the encrypted payload is encrypted using a payload public key (PPK);

decrypt the encrypted payload using a payload secret key (PSK) to obtain the plurality of signature entries;

obtain results of a verification by successively verifying each of the plurality of signature entries until a scoring threshold associated with the resource is at least met; and transmit, to the resource control entity, a notification comprising the results of the verification, wherein the resource control entity uses the results of the verification to determine whether to grant the user access to the resource;

generate a new PPK-PSK pair comprising a new PPK and a new PSK;

encrypt the plurality of signature entries with the new PPK to obtain a new encrypted payload, wherein the new encrypted payload is generated when successively verifying each of the plurality of signature entries;

discard the new PPK;

associate the new PSK with the user metadata; and send the new encrypted payload to the credential application.

9. A non-transitory computer readable medium comprising instructions that, when executed by a computer processor, perform a method for accessing a resource comprising:

receiving, by a ledger device, a request, corresponding to a user, to access the resource, wherein the resource is associated with a resource control entity;

in response to the request, obtaining user metadata corresponding to the user;

sending, to a user device of the user, a ledger authentication token (LAT), wherein a credential application, executing on the user device, uses the LAT to verify that the ledger device is a valid ledger;

receiving, from the credential application, an encrypted payload comprising a plurality of signature entries, wherein the encrypted payload is encrypted using a payload public key (PPK);

decrypting, by the ledger device, the encrypted payload using a payload secret key (PSK) to obtain the plurality of signature entries;

obtaining results of a verification by successively verifying each of the plurality of signature entries until a scoring threshold associated with the resource is at least met; and transmitting, to the resource control entity, a notification comprising the results of the verification, wherein the resource control entity uses the results of the verification to determine whether to grant the user access to the resource;

generating a new PPK-PSK pair comprising a new PPK and a new PSK;

encrypting the plurality of signature entries with the new PPK to obtain a new encrypted payload, wherein the new encrypted payload is generated when successively verifying each of the plurality of signature entries;

discarding the new PPK;

associating the new PSK with the user metadata; and sending the new encrypted payload to the credential application.

* * * * *